(12) United States Patent
Tsai et al.

(10) Patent No.: US 8,441,744 B2
(45) Date of Patent: May 14, 2013

(54) OPTICAL IMAGE SYSTEM

(75) Inventors: Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 92 days.

(21) Appl. No.: 13/180,554

(22) Filed: Jul. 12, 2011

(65) Prior Publication Data

US 2012/0250164 A1    Oct. 4, 2012

(30) Foreign Application Priority Data

Mar. 31, 2011  (TW) .............................. 100111332 A

(51) Int. Cl.
*G02B 3/02*   (2006.01)
*G02B 13/02*  (2006.01)
*G02B 9/34*   (2006.01)

(52) U.S. Cl.
USPC ............................ 359/715; 359/747; 359/771

(58) Field of Classification Search .......... 359/708–715, 359/745–747, 754–757, 759, 760, 763, 764, 359/767–769, 771, 772, 779
See application file for complete search history.

(56) References Cited

U.S. PATENT DOCUMENTS 7,532,415 B2 *  5/2009  Sato .............................. 359/779
7,589,918 B2 *  9/2009  Sato .............................. 359/779
8,125,719 B2 *  2/2012  Aoi .............................. 359/772

* cited by examiner

*Primary Examiner* — Darryl J Collins
(74) *Attorney, Agent, or Firm* — CKC & Partners Co., Ltd.

(57) ABSTRACT

An optical image system includes, in order from an object side to an image side, a first lens element with positive refractive power and having a convex object-side surface, a second lens element with positive refractive power, a third lens element with negative refractive power and having a concave object-side surface and a convex image-side surface, and a fourth lens element with refractive power and having a concave image-side surface. By such an arrangement, the total track length and photosensitivity of the image capturing lens assembly can be effectively reduced while retaining a high image quality.

15 Claims, 16 Drawing Sheets

OPTICAL IMAGE SYSTEM

RELATED APPLICATIONS

The application claims priority to Taiwan Application Serial Number 100111332, filed Mar. 31, 2011, which is herein incorporated by reference.

BACKGROUND

1. Technical Field

The present invention relates to an optical image system. More particularly, the present invention relates to a compact optical image system applicable to electronic products.

2. Description of Related Art

In recent years, with the popularity of mobile products with camera functionalities, the demand for compact optical image systems is increasing. The sensor of a conventional photographing camera is typically a CCD (Charge Coupled Device) or a CMOS (Complementary Metal-Oxide Semiconductor Sensor). As advanced semiconductor manufacturing technologies have allowed the pixel size of sensors to be reduced and compact optical image systems have gradually evolved toward higher megapixels, there is an increasing demand for compact optical image systems featuring better image quality.

A conventional compact optical image system in a portable electronic product typically utilizes a three-element lens structure. Such a conventional optical image system has a first lens element with positive refractive power, a second lens element with negative refractive power and a third lens element with positive refractive power. The first, second and third lens elements are arranged in this order from an object-side to an image-side. While the three-element lens structure is compact, it is not able to produce high quality images.

Further, another conventional compact optical image system provides a four-element lens structure. The first lens element and the second lens element of the four-element lens structure are two glass spherical lens elements which are attached to each other to form a doublet lens for eliminating chromatic aberration. However, this lens structure requires a longer total optical track length caused by insufficient degrees of freedom in setting system parameters due to too many spherical lenses allocated. Moreover, it is not easy to attach the glass lenses, and thus the manufacturing process for forming the glass doublet lenses is difficult.

SUMMARY

According to one aspect of the present disclosure, an optical image system includes, in order from an object side to an image side, a first lens element, a second lens element, a third lens element and a fourth lens element. The first lens element with positive refractive power has a convex object-side surface. The second lens element has positive refractive power. The third lens element with negative refractive power has a concave object-side surface and a convex image-side surface. The fourth lens element with refractive power has a concave image-side surface. When a focal length of the optical image system is f, a focal length of the first lens element is f1, a focal length of the second lens element is f2, a central thickness of the second lens element is CT2, and an axial distance between the second lens element and the third lens element is T23, the following relationships are satisfied:

$0.5 < f/f1 < 1.5;$ $0 < f/f2 < 1.0;$ and $0.2 < CT2/T23 < 1.1.$

According to another aspect of the present disclosure, an optical image system includes, in order from an object side to an image side, a first lens element, a second lens element, a third lens element and a fourth lens element. The first lens element with positive refractive power has a convex object-side surface. The second lens element has positive refractive power. The third lens element with negative refractive power has a concave object-side surface and a convex image-side surface, wherein the object-side surface and the image-side surface of the third lens element are aspheric. The fourth lens element with refractive power has a concave image-side surface, wherein the object-side surface and the image-side surface are aspheric. When a focal length of the optical image system is f, a focal length of the first lens element is f1, a focal length of the second lens element is f2, a central thickness of the first lens element is CT1, a central thickness of the second lens element is CT2, a central thickness of the third lens element is CT3, a central thickness of the fourth lens element is CT4, and a curvature radius of the object-side surface of the second lens element is R3, the following relationships are satisfied:

$0.5 < f/f1 < 1.5;$ $0 < f/f2 < 1.0;$ $0.7 < (CT1+CT2+CT3)/(CT4) < 1.9;$ and $-0.6 < f/R3 < 1.95.$

DETAILED DESCRIPTION

Figure 1:
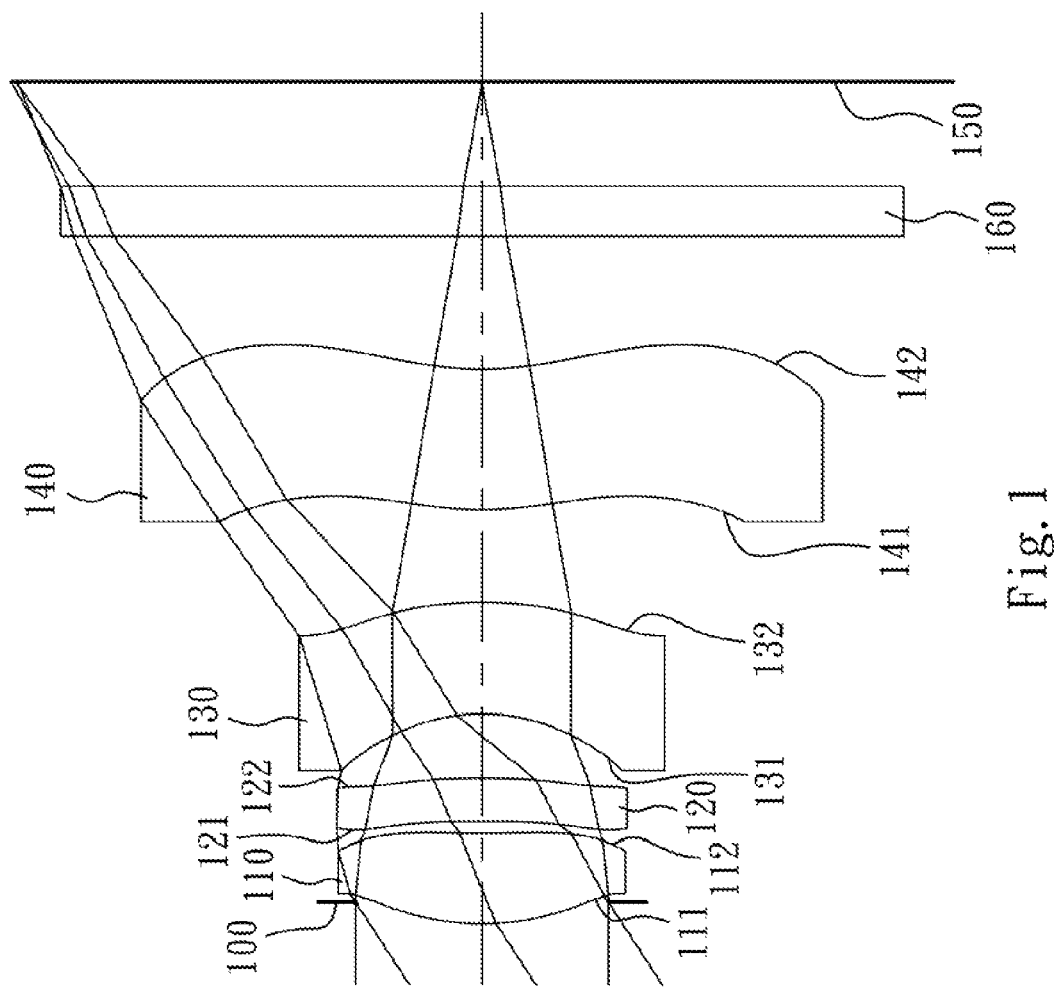
FIG. 1 is a schematic view of an optical image system according to the first embodiment of the present disclosure.

An optical image system includes, in order from an object side to an image side, a first lens element, a second lens element, a third lens element and a fourth lens element. The optical image system further includes an image sensor located on the image plane.

The first lens element with positive refractive power provides partial refractive power for reducing the total track length of the optical image system. The first lens element can have a convex object-side surface and a convex image-side surface or a convex object-side surface and a concave image-side surface. When the first lens element has a convex object-side surface and a convex image-side surface, the refractive power thereof can be effectively enhanced, thus further reducing the total track length of the optical image system. When the first lens element has a convex object-side surface and a concave image-side surface, the astigmatism of the optical image system can be corrected.

The second lens element with positive refractive power provides main refractive power for reducing the total track length of the optical image system. Furthermore, the second lens element with the positive refractive power also provides a distribution of the first lens element for reducing the photosensitivity of the optical image system.

The third lens element with negative refractive power can correct the aberration generated from the second lens element and can further correct the chromatic aberration within the optical image system. The third lens element has a concave object-side surface and a convex image-side surface, so that the astigmatism of the optical image system can be corrected.

The fourth lens element can have positive refractive power or negative refractive power. When the fourth lens element has positive refractive power, the high-order aberration of the optical image system can be corrected while enhancing the resolving power thereof. When the fourth lens element has negative refractive power, the principal point of the optical image system can be positioned away from the image plane, and the total track length of the optical image system can be reduced so as to maintain the compact size of the optical image system.

When a focal length of the optical image system is f and a focal length of the first lens element is f1, the following relationship is satisfied:

$$0.5 < f/f1 < 1.5.$$

Therefore, the refractive power of the first lens element can control the total track length of the optical image system and avoid the high-order spherical aberration thereof.

f and f1 can further satisfy the following relationship:

$$0.80 < f/f1 < 1.35.$$

When the focal length of the optical image system is f and a focal length of the second lens element is f2, the following relationship is satisfied:

$$0 < f/f2 < 1.0.$$

Therefore, the refractive power of the second lens element can be controlled for reducing the total track length of the optical image system.

f and f2 can further satisfy the following relationship:

$$0.15 < f/f2 < 0.8.$$

When a central thickness of the second lens element is CT2 and an axial is distance between the second lens element and the third lens element is T23, the following relationship is satisfied:

$$0.2 < CT2/T23 < 1.1.$$

Therefore, the arrangement of the thickness of the second lens element and the distance between the second lens element and a third lens element can reduce the total track length of the optical image system.

CT2 and T23 can further satisfy the following relationship:

$$0.35 < CT2/T23 < 0.9.$$

When a curvature radius of the object-side surface of the third lens element is R5 and a curvature radius of the image-side surface of the third lens element is R6, the following relationship is satisfied:

$$-0.65 < (R5-R6)/(R5+R6) < -0.05.$$

When the above relationship is satisfied, correction of the astigmatism of the optical image system by the crescent-shaped third lens element can be ensured.

The optical image system further includes a stop, which can be an aperture stop. When an axial distance between the stop and an image plane is SL, and an axial distance between the object-side surface of the first lens element and the image plane is TTL, the following relationship is satisfied:

$$0.8 < SL/TTL < 1.1.$$

If SL/TTL<0.8, this would result in the angle of incidence on the image sensor being too large, which would cause poor photographic performance of the image sensor as well as too much chromatic aberration within the optical image system. If SL/TTL>1.1, this would result in the total track length of the optical image system being too long. Therefore, when SL/TTL satisfies the above relationship, the optical image system has the telecentric or wide-angle characteristic, and a desirable total track length of the optical image system can be maintained.

When a central thickness of the first lens element is CT1, the central thickness of the second lens element is CT2, a central thickness of the third lens element is CT3, and a central thickness of the fourth lens element is CT4, the following relationship is satisfied:

$$0.7 < (CT1+CT2+CT3)/(CT4) < 1.9.$$

Therefore, the thicknesses of the first lens element, the second lens element, the third lens element and the fourth lens element are at correct amounts, so that these lens elements can be assembled easier and the optical image system is not too large.

When the focal length of the optical image system is f and a curvature radius of the object-side surface of the first lens element is R1, the following relationship is satisfied:

$$0.20 < R1/f < 0.55.$$

If R1/f<0.20, this would result in the refractive power of the first lens element being too high to thereby generate the high-order aberration. If R1/f>0.55, this would result in an inability to reduce the total track length of the optical image system because of the low positive refractive power. Therefore, when R1/f satisfies the above relationship, the high-order aberration and the total track length can be reduced effectively.

When the focal length of the optical image system is f and a curvature radius of the object-side surface of the second lens element is R3, the following relationship is satisfied:

$$-0.6 < f/R3 < 1.95.$$

Therefore, the curvature of the object-side surface of the second lens element can correct the aberration of the optical image system.

f and R3 can further satisfy the following relationship:

$$-0.6 < f/R3 < 1.2.$$

When the Abbe number of the first lens element is V1 and the Abbe number of the third lens element is V3, the following relationship is satisfied:

$$26 < V1 - V3 < 40.$$

Therefore, the ability for correcting the chromatic aberration of the optical image system can be enhanced.

When a half of a diagonal length of an effective photosensitive area of the image sensor is lmgh, and the axial distance between the object-side surface of the first lens element and the image plane is TTL, the following relationship is satisfied:

$$TTL/lmgh < 2.0.$$

Therefore, the total track length of the optical image system can be reduced, so as to maintain the compact size of the optical image system. As a result, the optical image system may be applied to lightweight and portable electronic products.

According to the optical image system of the present disclosure, when the lens element has a convex surface, this indicates that the paraxial region of the surface is convex, and when the lens element has a concave surface, this indicates that the paraxial region of the surface is concave.

According to the optical image system of the present disclosure, the lens element can be made of glass material or plastic material. When the lens element is made of glass material, the distribution of degree of freedom of the refractive power of the optical image system can be increased. When the lens element is made of plastic material, the cost of manufacture can be effectively reduced. Moreover, the surface of the lens element can be aspheric, so that it is easier to make the surface into other non-spherical shapes. As a result, more controllable variables are obtained, the aberration is reduced and the number of required lens elements is reduced. Therefore, the total track length of the optical image system can be reduced.

According to the optical image system of the present disclosure, the optical image system can include at least one diaphragm for reducing stray light while retaining high image quality.

According to the above description of the present invention, the following 1st-8th specific embodiments are provided for further explanation.

Figure 2:
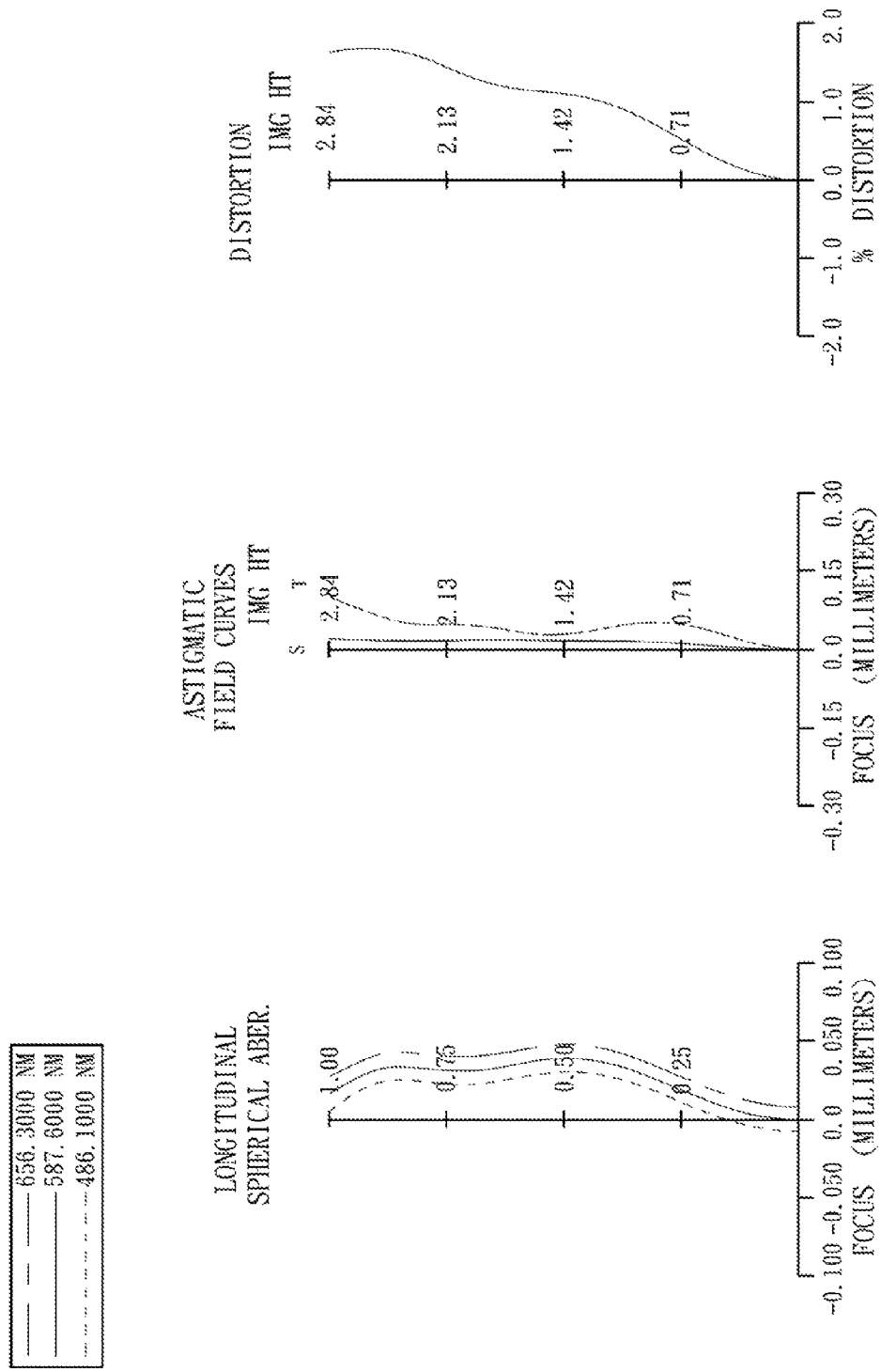
FIG. 2 shows spherical aberration curves, astigmatic field curves and a distortion curve of the optical image system according to the first embodiment.

FIG. 1 is a schematic view of an optical image system according to the first embodiment of the present disclosure. FIG. 2 shows spherical aberration curves, astigmatic field curves and a distortion curve of the optical image system according to the first embodiment. In FIG. 1, the optical image system includes, in order from an object side to an image side, an aperture stop 100, the first lens element 110, the second lens element 120, the third lens element 130, the fourth lens element 140, an IR (infrared) cut filter 160 and an image plane 150.

The first lens element 110 is made of plastic material. The first lens element 110 with positive refractive power has a convex object-side surface 111 and a concave image-side surface 112. The object-side surface 111 and the image-side surface 112 of the first lens element 110 are aspheric.

The second lens element 120 is made of plastic material. The second lens element 120 with positive refractive power has a concave object-side surface 121 and a convex image-side surface 122. The object-side surface 121 and the image-side surface 122 of the second lens element 120 are aspheric.

The third lens element 130 is made of plastic material. The third lens element 130 with negative refractive power has a concave object-side surface 131 and a convex image-side surface 132. The object-side surface 131 and the image-side surface 132 of the third lens element 130 are aspheric.

The fourth lens element 140 is made of plastic material. The fourth lens element 140 with positive refractive power has a convex object-side surface 141 and a concave image-side surface 142. The object-side surface 141 and the image-side surface 142 of the fourth lens element 140 are aspheric. The fourth lens element 140 has inflection points formed on the object-side surface 141 and the image-side surface 142 thereof.

The IR cut filter 160 is made of glass and located between the fourth lens element 140 and the image plane 150, and will not affect the focal length of the optical image system.

The equation of the aspheric surface profiles of the aforementioned lens elements of the first embodiment is expressed as follows:

$$X(Y) = (Y^2/R)/\left(1 + sqrt\left(1 - (1+k) \times (Y/R)^2\right)\right) + \sum_i (Ai) \times (Y^i)$$

where:
X is the height of a point on the aspheric surface spaced at a distance Y from the optical axis relative to the tangential plane at the aspheric surface vertex;
Y is the distance from the point on the curve of the aspheric surface to the optical axis;
k is the conic coefficient; and
Ai is the i-th aspheric coefficient.

In the optical image system according to the first embodiment, when f is a focal length of the optical image system, Fno is an f-number of the optical image system, and HFOV is half of the maximal field of view, these parameters have the following values:

f=4.27 mm;

Fno=2.80; and

HFOV=33.1 degrees.

In the optical image system according to the first embodiment, when the Abbe number of the first lens element 110 is V1 and the Abbe number of the third lens element 130 is V3, the following relationship is satisfied:

$$V1 - V3 = 34.5.$$

In the optical image system according to the first embodiment, when the central thickness of the second lens element 120 is CT2, and the axial distance between the second lens element 120 and the third lens element 130 is T23, the following relationship is satisfied:

$$CT2/T23 = 0.68.$$

In the optical image system according to the first embodiment, when the central thickness of the first lens element 110 is CT1, the central thickness of the second lens element 120 is CT2, the central thickness of the third lens element 130 is CT3, and the central thickness of the fourth lens element 140 is CT4, the following relationship is satisfied:

$(CT1+CT2+CT3)/(CT4)=1.75$.

In the optical image system according to the first embodiment, when the focal length of the optical image system is f, the curvature radius of the object-side surface 111 of the first lens element 110 is R1, and the curvature radius of the object-side surface 121 of the second lens element 120 is R3, the following relationships are satisfied:

$R1/f=0.36$; and $f/R3=-0.18$.

In the optical image system according to the first embodiment, when the curvature radius of the object-side surface 131 of the third lens element 130 is R5, and the curvature radius of the image-side surface 132 of the third lens element 130 is R6, the following relationship is satisfied:

$(R5-R6)/(R5+R6)=-0.34$.

In the optical image system according to the first embodiment, when the focal length of the optical image system is f, the focal length of the first lens element 110 is f1, and the focal length of the second lens element 120 is f2, the following relationships are satisfied:

$f/f1=1.24$; and $f/f2=0.35$.

In the optical image system according to the first embodiment, when the axial distance between the aperture stop 100 and the image plane 150 is SL, and the axial distance between the object-side surface 111 of the first lens element 110 and the image plane 150 is TTL, the following relationship is satisfied:

$SL/TTL=0.97$.

In the optical image system according to the first embodiment, when the half of a diagonal length of an effective photosensitive area of the image sensor is lmgh, and the axial distance between the object-side surface 111 of the first lens element 110 and the image plane 150 is TTL, the following relationship is satisfied:

$TTL/lmgh=1.75$.

The detailed optical data of the first embodiment are shown in Table 1 and the aspheric surface data are shown in Table 2 below.

TABLE 1

1st Embodiment
f = 4.27 mm, Fno = 2.80, HFOV = 33.1 deg.

| Surface # |           | Curvature Radius | Thickness | Material | Index | Abbe # | Focal length |
|-----------|-----------|------------------|-----------|----------|-------|--------|--------------|
| 0         | Object    | Plano            | Infinity  |          |       |        |              |
| 1         | Ape. Stop | Plano            | -0.131    |          |       |        |              |
| 2         | Lens 1    | 1.546150 (ASP)   | 0.547     | Plastic  | 1.544 | 55.9   | 3.43         |
| 3         |           | 7.850100 (ASP)   | 0.070     |          |       |        |              |
| 4         | Lens 2    | -23.640700 (ASP) | 0.262     | Plastic  | 1.544 | 55.9   | 12.05        |
| 5         |           | -5.154800 (ASP)  | 0.388     |          |       |        |              |
| 6         | Lens 3    | -1.269440 (ASP)  | 0.676     | Plastic  | 1.650 | 21.4   | -4.86        |
| 7         |           | -2.567570 (ASP)  | 0.556     |          |       |        |              |
| 8         | Lens 4    | 1.911660 (ASP)   | 0.850     | Plastic  | 1.544 | 55.9   | 23.97        |
| 9         |           | 1.889030 (ASP)   | 0.800     |          |       |        |              |
| 10        | IR-filter | Plano            | 0.300     | Glass    | 1.516 | 64.1   | —            |
| 11        |           | Plano            | 0.631     |          |       |        |              |
| 12        | Image     | Plano            | —         |          |       |        |              |

Note:
Reference wavelength (d-line) is 587.6 nm

TABLE 2

Aspheric Coefficients

| Surface # | 2 | 3 | 4 | 5 |
|---|---|---|---|---|
| k = | -6.96727E-01 | 5.44708E+01 | -1.00000E+00 | -1.00000E+00 |
| A4 = | 2.75108E-03 | -2.83902E-01 | -3.54246E-01 | -1.85908E-01 |
| A6 = | -6.47529E-02 | -1.71499E-01 | 2.32364E-01 | 2.60392E-01 |
| A8 = | 1.57815E-01 | 4.82137E-01 | 5.27183E-01 | 5.53542E-01 |
| A10 = | -4.96029E-01 | -2.56953E-01 | -1.50755E-01 | -8.82112E-01 |
| A12 = | 2.37628E-01 | -2.17433E-01 | -2.94214E-01 | 3.39222E-01 |
| A14 = | 1.38137E-01 | -9.49383E-02 | -4.87397E-01 | 1.40352E-02 |
| A16 = | -3.34711E-01 | 1.98731E-01 | 6.09278E-01 | -2.11255E-01 |

| Surface # | 6 | 7 | 8 | 9 |
|---|---|---|---|---|
| k = | -5.85916E+00 | 9.43564E-01 | -7.98849E+00 | -5.66069E+00 |
| A4 = | -5.39840E-01 | -1.73752E-01 | -1.63037E-01 | -9.60920E-02 |

TABLE 2-continued

| Aspheric Coefficients | | | | |
|---|---|---|---|---|
| A6 = | 7.05538E−01 | 2.61171E−01 | 6.04690E−02 | 2.92936E−02 |
| A8 = | −4.45739E−01 | −1.22877E−01 | −9.26158E−03 | −6.18718E−03 |
| A10 = | 1.15831E−01 | 7.55238E−02 | 1.85516E−04 | 6.32930E−04 |
| A12 = | −1.46536E−01 | −1.55065E−02 | −1.97813E−04 | −1.75723E−05 |
| A14 = | 1.78180E−01 | −2.92932E−02 | −1.30795E−04 | −4.54229E−06 |
| A16 = | −3.37540E−01 | 1.67067E−02 | 5.79195E−05 | 1.19401E−07 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

Figure 3:
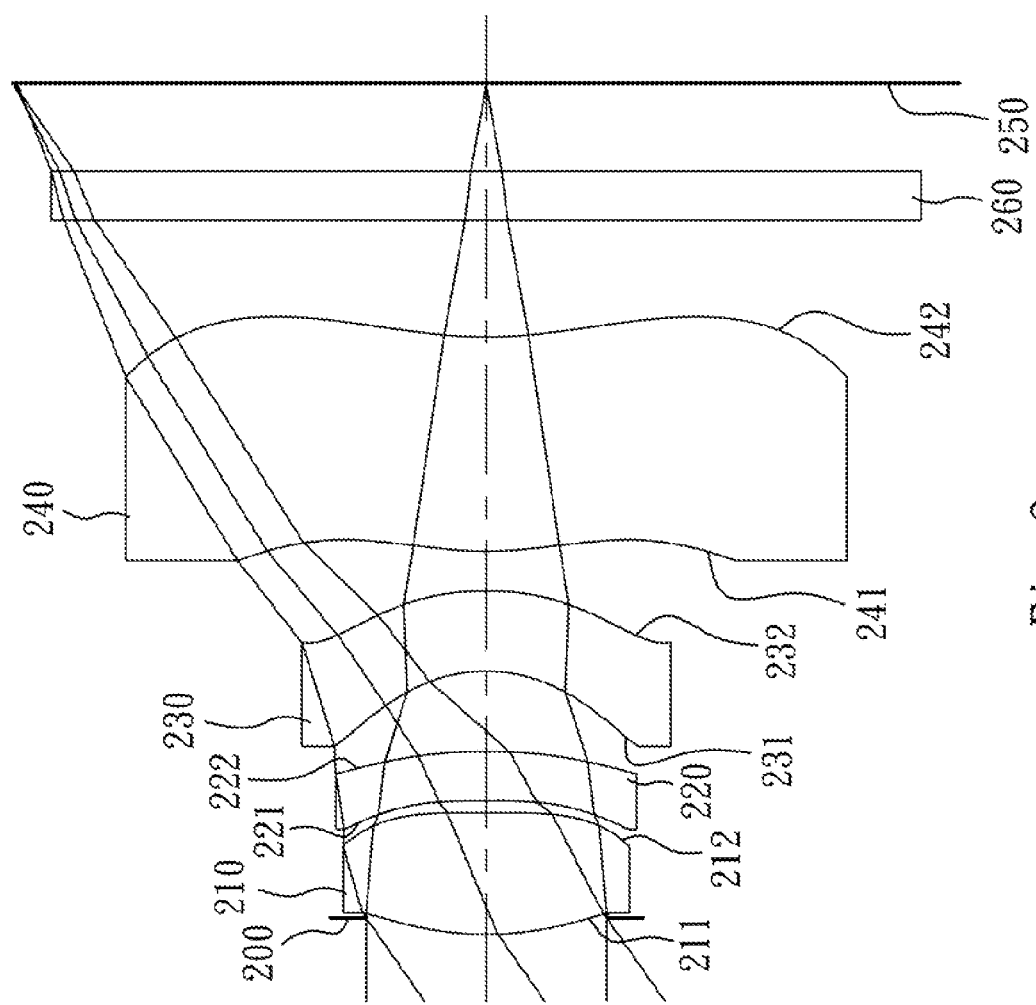
FIG. 3 is a schematic view of an optical image system according to the second embodiment of the present disclosure.
Figure 4:
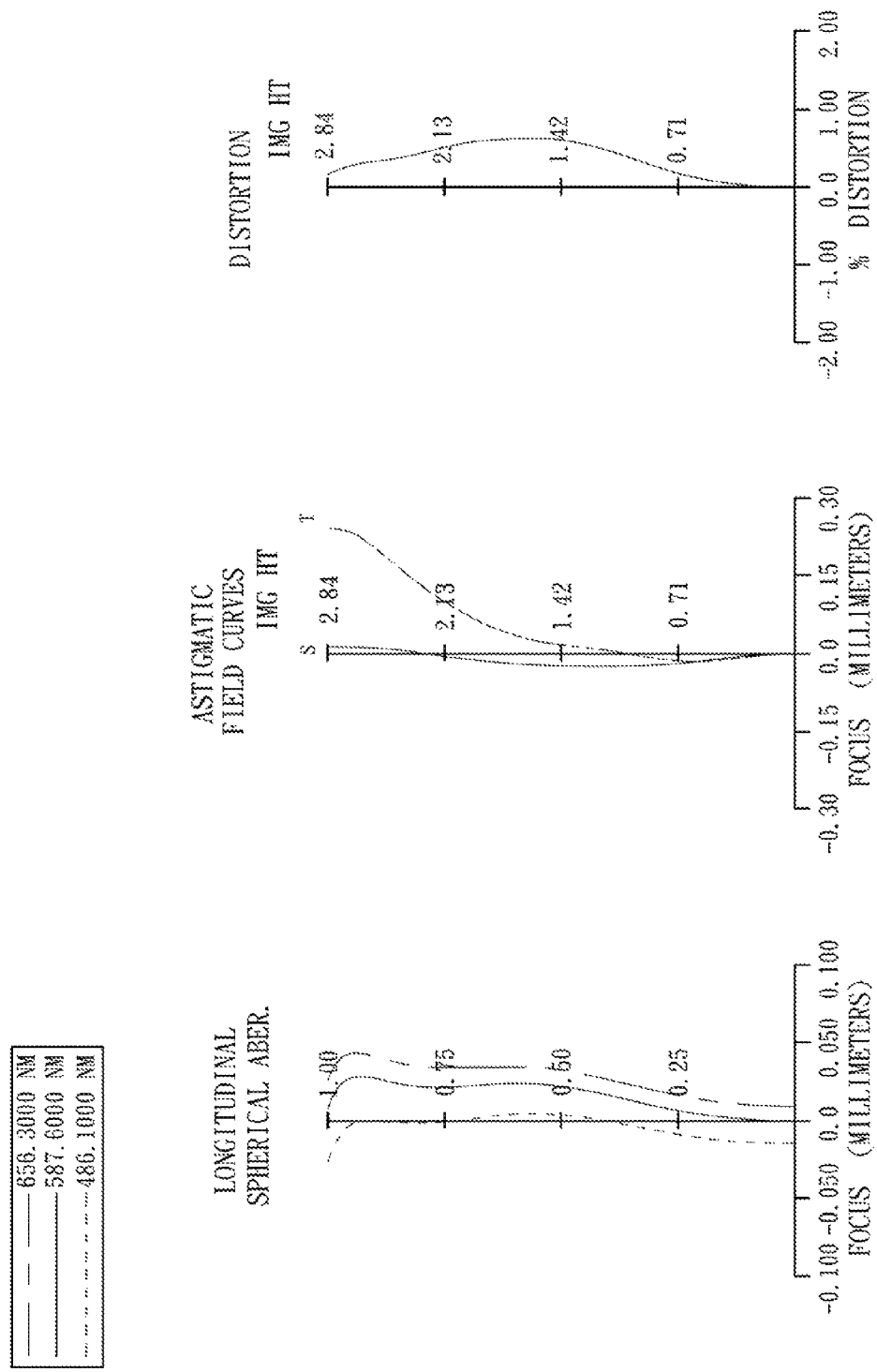
FIG. 4 shows spherical aberration curves, astigmatic field curves and a distortion curve of the optical image system according to the second embodiment.

FIG. 3 is a schematic view of an optical image system according to the second embodiment of the present disclosure. FIG. 4 shows spherical aberration curves, astigmatic field curves and a distortion curve of the optical image system according to the second embodiment. In FIG. 3, the optical image system includes, in order from an object side to an image side, an aperture stop 200, the first lens element 210, the second lens element 220, the third lens element 230, the fourth lens element 240, an IR (infrared) cut filter 260 and an image plane 250.

The first lens element 210 is made of plastic material. The first lens element 210 with positive refractive power has a convex object-side surface 211 and a concave image-side surface 212. The object-side surface 211 and the image-side surface 212 of the first lens element 210 are aspheric.

The second lens element 220 is made of plastic material. The second lens element 220 with positive refractive power has a conclave object-side surface 221 and a convex image-side surface 222. The object-side surface 221 and the image-side surface 222 of the second lens element 220 are aspheric.

The third lens element 230 is made of plastic material. The third lens element 230 with negative refractive power has a concave object-side surface 231 and a convex image-side surface 232. The object-side surface 231 and the image-side surface 232 of the third lens element 230 are aspheric.

The fourth lens element 240 is made of plastic material. The fourth lens element 240 with positive refractive power has a convex object-side surface 241 and a concave image-side surface 242. The object-side surface 241 and the image-side surface 242 of the fourth lens element 240 are aspheric. The fourth lens element 240 has inflection points formed on the object-side surface is 241 and the image-side surface 242 thereof.

The IR cut filter 260 is made of glass and located between the fourth lens element 240 and the image plane 250, and will not affect the focal length of the optical image system.

The equation of the aspheric surface profiles of the above lens elements of the second embodiment is the same as that of the first embodiment, and will not be stated herein again.

In the optical image system according to the second embodiment, the definitions of f, Fno, HFOV, V1, V3, CT1, CT2, CT3, CT4, T23, R1, R3, R5, R6, f1, f2, SL, TTL and Imgh are the same as those stated in the first embodiment with corresponding values for the second embodiment, and they have the following values and satisfy the following relationships:

| F | 4.04 | f/R3 | −0.34 |
|---|---|---|---|
| FNO | 2.80 | (R5 − R6)/(R5 + R6) | −0.31 |
| HFOV | 35.0 | f/f1 | 1.12 |
| V1 − V3 | 32.5 | f/f2 | 0.42 |
| CT2/T23 | 0.63 | SL/TTL | 0.98 |
| (CT1 + CT2 + CT3)/CT4 | 1.17 | TTL/Imgh | 1.76 |
| R1/f | 0.46 | | |

The detailed optical data of the second embodiment are shown in Table 3 and the aspheric surface data are shown in Table 4 below.

TABLE 3

2nd Embodiment
f = 4.04 mm, Fno = 2.80, HFOV = 35.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.100 | | | | |
| 2 | Lens 1 | 1.839730 | (ASP) | 0.729 | Plastic | 1.544 | 55.9 | 3.60 |
| 3 | | 25.927100 | (ASP) | 0.072 | | | | |
| 4 | Lens 2 | −11.990300 | (ASP) | 0.300 | Plastic | 1.544 | 55.9 | 9.63 |
| 5 | | −3.677400 | (ASP) | 0.480 | | | | |
| 6 | Lens 3 | −0.886370 | (ASP) | 0.481 | Plastic | 1.632 | 23.4 | −3.92 |
| 7 | | −1.669840 | (ASP) | 0.238 | | | | |
| 8 | Lens 4 | 2.110910 | (ASP) | 1.287 | Plastic | 1.544 | 55.9 | 9.63 |
| 9 | | 2.775530 | (ASP) | 0.700 | | | | |
| 10 | IR-filter | Plano | | 0.300 | Glass | 1.516 | 64.1 | — |
| 11 | | Plano | | 0.522 | | | | |
| 12 | Image | Plano | | — | | | | |

Note:
Reference wavelength (d-line) is 587.6 nm

TABLE 4

Aspheric Coefficients

| Surface # | 2 | 3 | 4 | 5 |
|---|---|---|---|---|
| k = | −1.40603E+00 | −1.00000E+00 | −1.00000E+00 | 9.78068E+00 |
| A4 = | −2.21683E−02 | −4.60563E−01 | −5.10091E−01 | −1.00923E−01 |
| A6 = | −3.33997E−02 | −5.48635E−02 | 1.33065E−01 | 1.12764E−01 |
| A8 = | 1.29747E−01 | 5.26833E−01 | 6.24645E−01 | 1.45161E−01 |
| A10 = | −4.33012E−01 | −3.28534E−01 | −2.98719E−01 | −3.78370E−01 |
| A12 = | 1.95142E−01 | −1.98363E−01 | −1.80202E−01 | 4.08465E−01 |
| A14 = | 1.43656E−01 | −9.44624E−02 | −5.28628E−01 | 1.55717E−02 |
| A16 = | −3.27123E−01 | 1.96836E−01 | 5.97867E−01 | −2.09382E−01 |

| Surface # | 6 | 7 | 8 | 9 |
|---|---|---|---|---|
| k = | −4.87651E+00 | −3.92866E−01 | −1.59594E+01 | −1.59053E+00 |
| A4 = | −5.83504E−01 | −1.29127E−01 | −1.24251E−01 | −8.55988E−02 |
| A6 = | 6.21168E−01 | 1.58917E−01 | 4.14966E−02 | 2.02452E−02 |
| A8 = | −5.37298E−01 | −1.10610E−01 | −1.08542E−02 | −4.10423E−03 |
| A10 = | 3.21303E−01 | 1.30544E−01 | 1.57951E−03 | 4.13079E−04 |
| A12 = | 1.30534E−01 | −2.37290E−03 | 3.00008E−04 | −1.05699E−05 |
| A14 = | 1.71722E−01 | −4.16965E−02 | −9.97356E−05 | −3.83272E−07 |
| A16 = | −3.40271E−01 | 1.19048E−02 | 6.35721E−06 | −1.92842E−07 |

Figure 5:
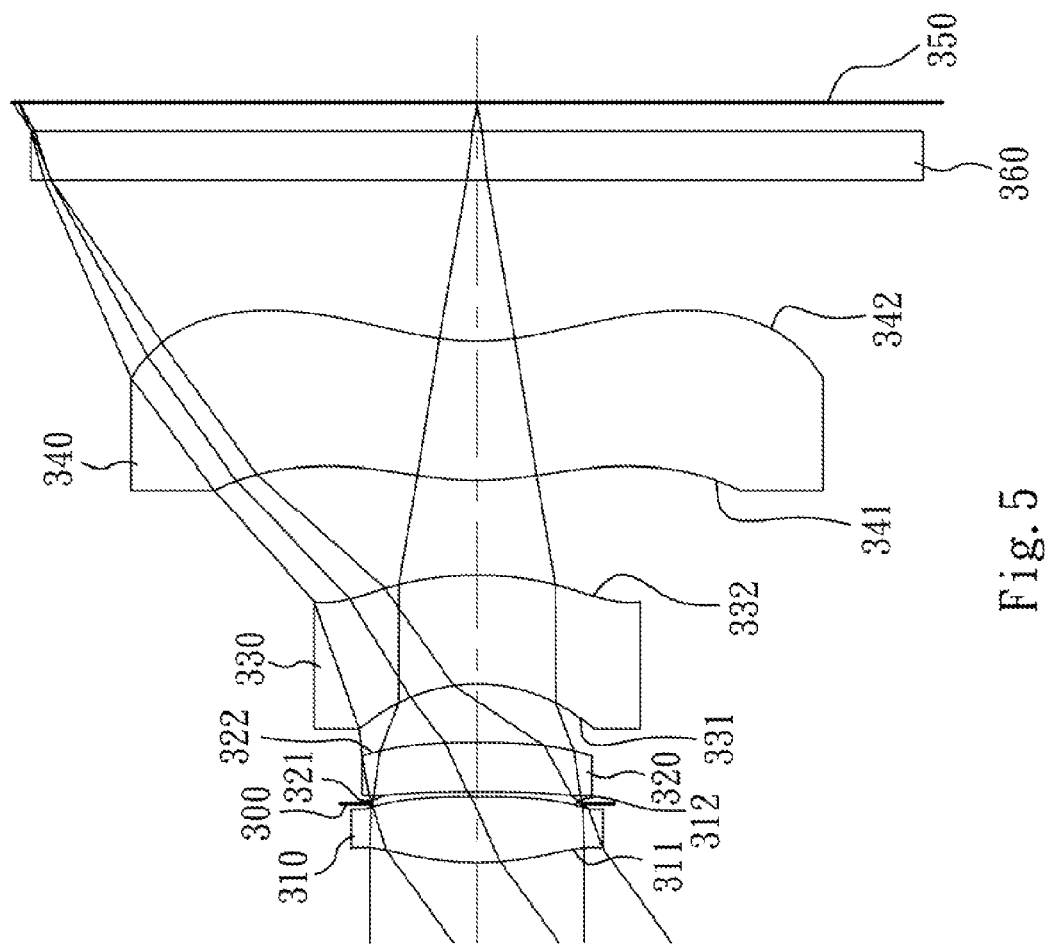
FIG. 5 is a schematic view of an optical image system according to the third embodiment of the present disclosure.
Figure 6:
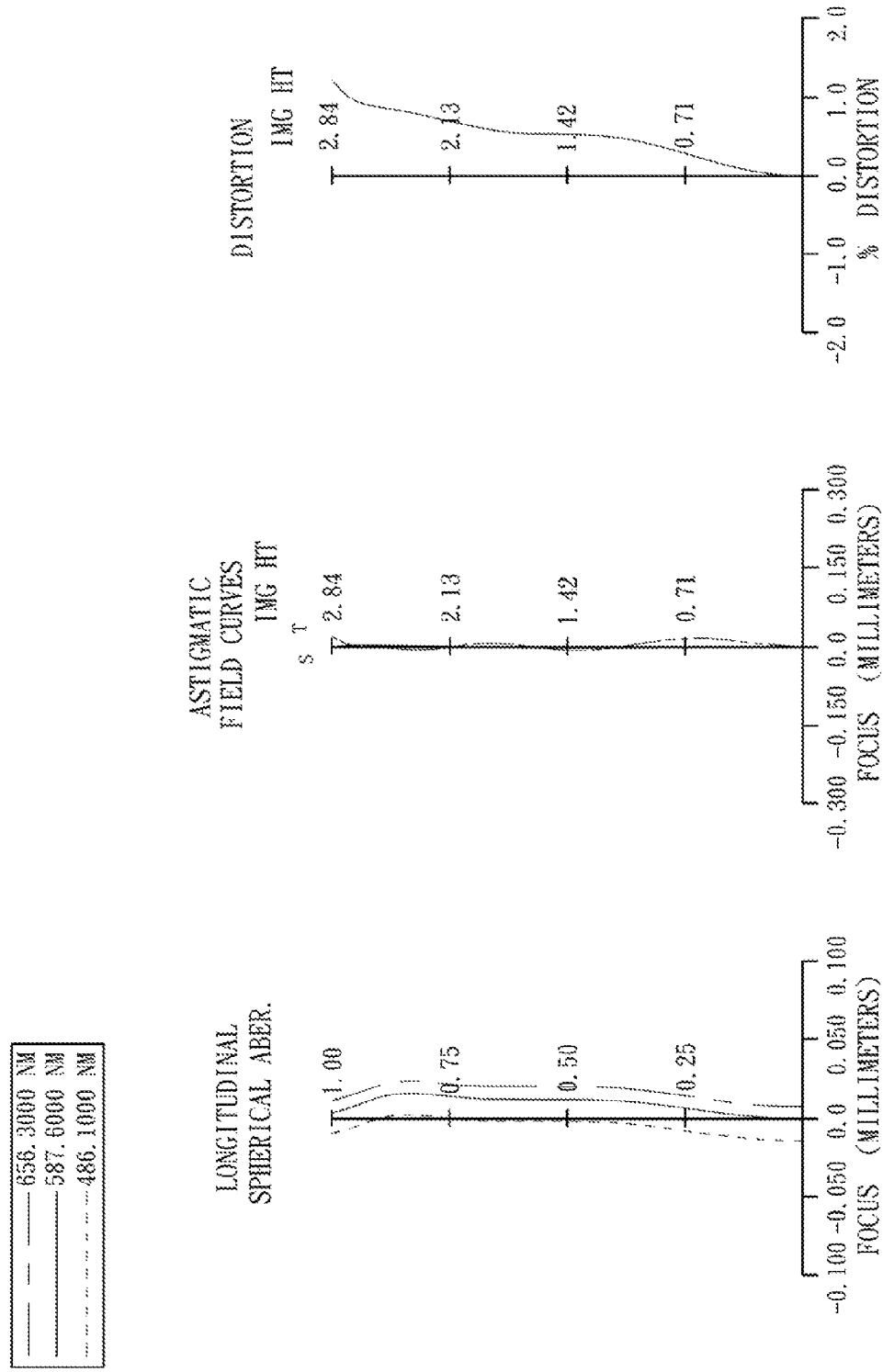
FIG. 6 shows spherical aberration curves, astigmatic field curves and a distortion curve of the optical image system according to the third embodiment.

FIG. 5 is a schematic view of an optical image system according to the third embodiment of the present disclosure. FIG. 6 shows spherical aberration curves, astigmatic field curves and a distortion curve of the optical image system according to the third embodiment. In FIG. 5, the optical image system includes, in order from an object side to an image side, the first lens element 310, an aperture stop 300, the second lens element 320, the third lens element 330, the fourth lens element 340, an IR (infrared) cut filter 360 and an image plane 350.

The first lens element 310 is made of plastic material. The first lens element 310 with positive refractive power has a convex object-side surface 311 and a convex image-side surface 312. The object-side surface 311 and the image-side surface 312 of the first lens element 310 are aspheric.

The second lens element 320 is made of plastic material. The second lens element 320 with positive refractive power has a concave object-side surface 321 and a convex image-side surface 322. The object-side surface 321 and the image-side surface 322 of the second lens element 320 are aspheric.

The third lens element 330 is made of plastic material. The third lens element 330 with negative refractive power has a concave object-side surface 331 and a convex image-side surface 332. The object-side surface 331 and the image-side surface 332 of the third lens element 330 are aspheric.

The fourth lens element 340 is made of plastic material. The fourth lens element 340 with negative refractive power has a convex object-side surface 341 and a concave image-side surface 342. The object-side surface 341 and the image-side surface 342 of the fourth lens element 340 are aspheric. The fourth lens element 340 has inflection points formed on the object-side surface 341 and the image-side surface 342 thereof.

The IR cut filter 360 is made of glass and located between the fourth lens element 340 and the image plane 350, and will not affect the focal length of the optical image system.

The equation of the aspheric surface profiles of the above lens elements of the third embodiment is the same as that of the first embodiment, and will not be stated herein again.

In the optical image system according to the third embodiment, the definitions of f, Fno, HFOV, V1, V3, CT1, CT2, CT3, CT4, T23, R1, R3, R5, R6, f1, f2, SL, TTL and Imgh are the same as those stated in the first embodiment with corresponding values for the third embodiment, and they have the following values and satisfy the following relationships:

| | | | |
|---|---|---|---|
| F | 3.88 | f/R3 | −0.10 |
| FNO | 2.95 | (R5 − R6)/(R5 + R6) | −0.31 |
| HFOV | 35.8 | f/f1 | 1.33 |
| V1 − V3 | 32.1 | f/f2 | 0.31 |
| CT2/T23 | 0.87 | SL/TTL | 0.92 |
| (CT1 + CT2 + CT3)/CT4 | 1.62 | TTL/Imgh | 1.62 |
| R1/f | 0.46 | | |

The detailed optical data of the third embodiment are shown in Table 5 and the aspheric surface data are shown in Table 6 below.

TABLE 5

3rd Embodiment
f = 3.88 mm, Fno = 2.95, HFOV = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.799930 (ASP) | 0.404 | Plastic | 1.544 | 55.9 | 2.92 |
| 2 | | −12.350900 (ASP) | −0.044 | | | | |
| 3 | Ape. Stop | Plano | 0.074 | | | | |
| 4 | Lens 2 | −39.261900 (ASP) | 0.311 | Plastic | 1.544 | 55.9 | 12.61 |

TABLE 5-continued

3rd Embodiment
f = 3.88 mm, Fno = 2.95, HFOV = 35.8 deg.

| Surface # | | Curvature Radius | Thickness | Material | Index | Abbe # | Focal length |
|---|---|---|---|---|---|---|---|
| 5 | | −5.858500 (ASP) | 0.358 | | | | |
| 6 | Lens 3 | −1.121410 (ASP) | 0.676 | Plastic | 1.634 | 23.8 | −4.99 |
| 7 | | −2.144560 (ASP) | 0.591 | | | | |
| 8 | Lens 4 | 1.913110 (ASP) | 0.861 | Plastic | 1.530 | 55.8 | −316.16 |
| 9 | | 1.596640 (ASP) | 1.000 | | | | |
| 10 | IR-filter | Plano | 0.300 | Glass | 1.516 | 64.1 | — |
| 11 | | Plano | 0.179 | | | | |
| 12 | Image | Plano | — | | | | |

Note:
Reference wavelength (d-line) is 587.6 nm

TABLE 6

Aspheric Coefficients

| | Surface # | | | |
|---|---|---|---|---|
| | 1 | 2 | 4 | 5 |
| k = | −1.91005E+00 | 1.00000E+00 | −1.00000E+00 | −1.00000E+00 |
| A4 = | −3.43741E−02 | −3.11504E−01 | −2.68188E−01 | −1.81235E−01 |
| A6 = | −1.30667E−01 | −2.33894E−02 | 2.13812E−01 | 5.02720E−03 |
| A8 = | −6.89615E−02 | 5.21859E−01 | 4.88961E−01 | 2.78699E−01 |
| A10 = | −6.40978E−01 | −5.42902E−01 | 3.58591E−02 | −7.04995E−01 |
| A12 = | 2.02121E−01 | −2.95420E−01 | −1.50981E−01 | 4.41155E−01 |
| A14 = | 1.84931E−01 | 1.04819E+00 | −2.36859E−01 | 4.08900E−01 |
| A16 = | 8.55827E−01 | 1.98897E−01 | 6.09777E−01 | −2.11018E−01 |

| | Surface # | | | |
|---|---|---|---|---|
| | 6 | 7 | 8 | 9 |
| k = | −4.74852E+00 | −2.43793E−01 | −9.84519E+00 | −5.99125E+00 |
| A4 = | −5.68116E−01 | −1.31533E−01 | −1.43841E−01 | −8.26774E−02 |
| A6 = | 6.49653E−01 | 2.73922E−01 | 5.47163E−02 | 2.46484E−02 |
| A8 = | −3.58433E−01 | −1.11314E−01 | −9.65635E−03 | −5.60482E−03 |
| A10 = | 1.80189E−01 | 8.23009E−02 | 5.08690E−04 | 6.05392E−04 |
| A12 = | −4.34835E−01 | −1.39056E−02 | −5.13168E−05 | −9.72147E−06 |
| A14 = | 3.35124E−01 | −3.21256E−02 | −1.26764E−04 | −4.51335E−06 |
| A16 = | −3.37392E−01 | 1.26596E−02 | 4.11675E−05 | −1.01220E−07 |

Figure 7:
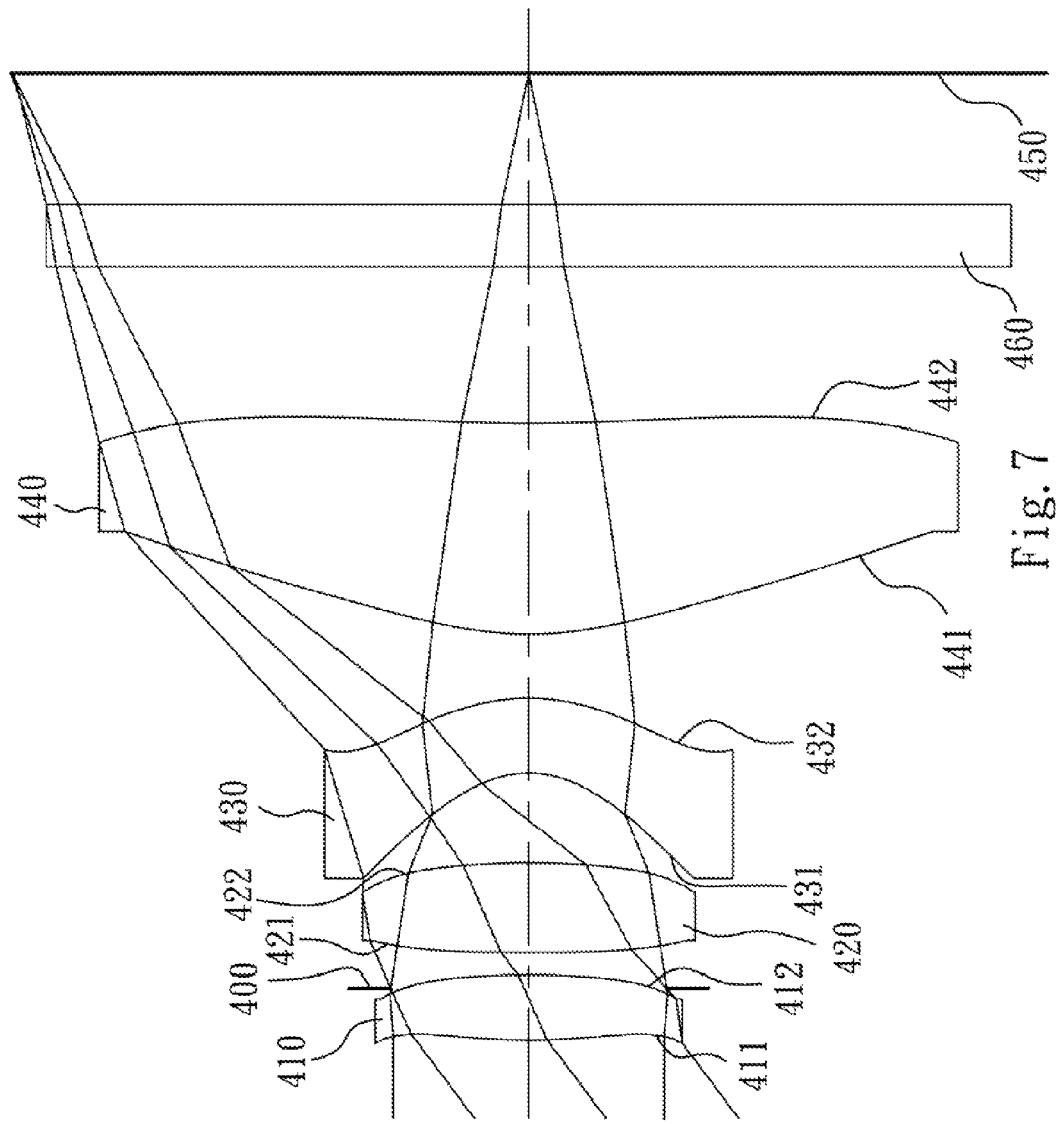
FIG. 7 is a schematic view of an optical image system according to the fourth embodiment of the present disclosure.
Figure 8:
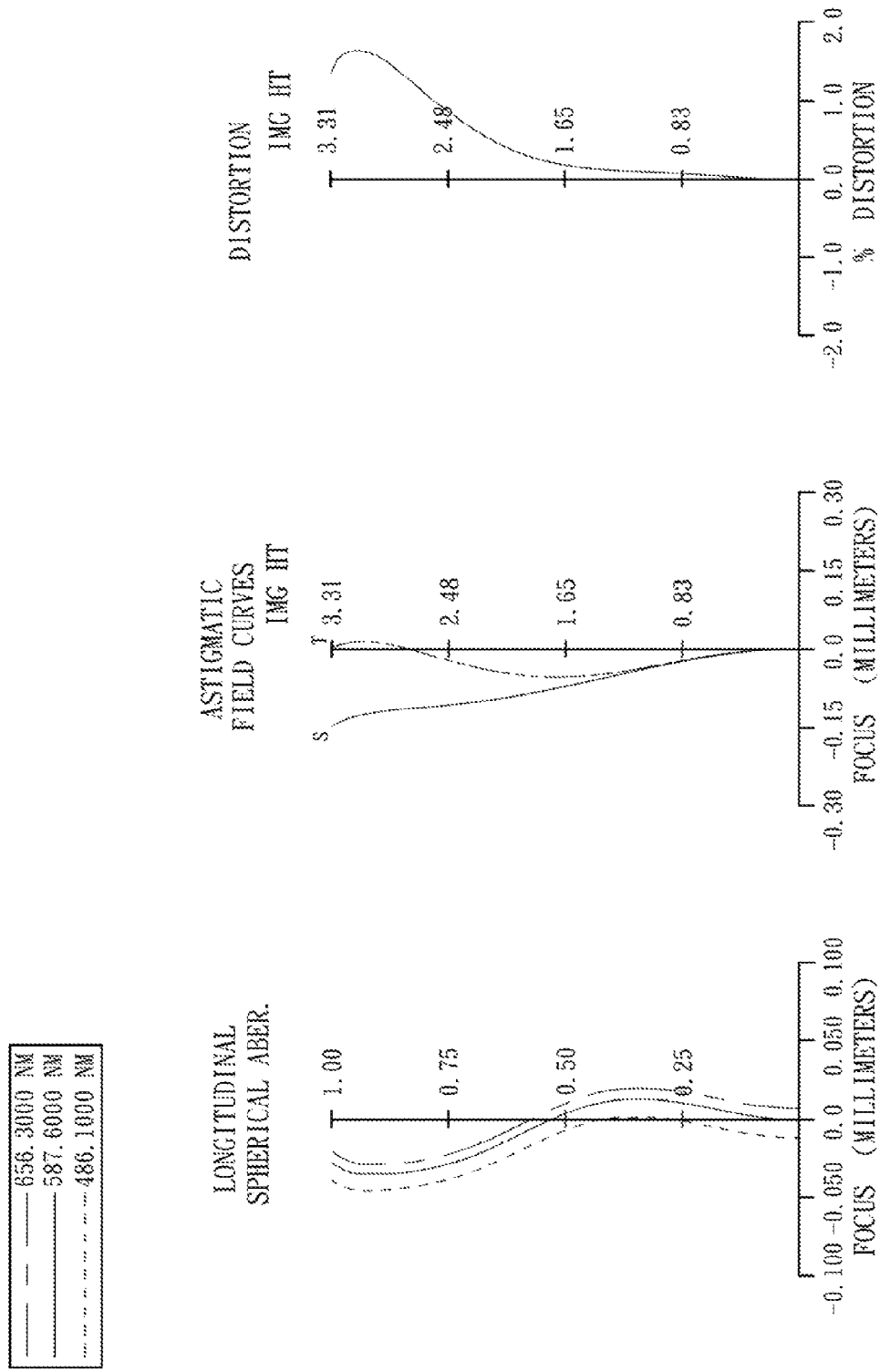
FIG. 8 shows spherical aberration curves, astigmatic field curves and a distortion curve of the optical image system according to the fourth embodiment.

FIG. 7 is a schematic view of an optical image system according to the fourth embodiment of the present disclosure. FIG. 8 shows spherical aberration curves, astigmatic field curves and a distortion curve of the optical image system according to the fourth embodiment. In FIG. 7, the optical image system includes, in order from an object side to an image side, the first lens element 410, an aperture stop 400, the second lens element 420, the third lens element 430, the fourth lens element 440, an IR (infrared) cut filter 460 and an image plane 450.

The first lens element 410 is made of plastic material. The first lens element 410 with positive refractive power has a convex object-side surface 411 and a convex image-side surface 412. The object-side surface 411 and the image-side surface 412 of the first lens element 410 are aspheric.

The second lens element 420 is made of plastic material. The second lens element 420 with positive refractive power has a convex object-side surface 421 and a convex image-side surface 422. The object-side surface 421 and the image-side surface 422 of the second lens element 420 are aspheric.

The third lens element 430 is made of plastic material. The third lens element 430 with negative refractive power has a concave object-side surface 431 and a convex image-side surface 432. The object-side surface 431 and the image-side surface 432 of the third lens element 430 are aspheric.

The fourth lens element 440 is made of plastic material. The fourth lens element 440 with positive refractive power has a convex object-side surface 441 and a concave image-side surface 442. The object-side surface 441 and the image-side surface 442 of the fourth lens element 440 are aspheric. The fourth lens element 440 has inflection points formed on the object-side surface 441 and the image-side surface 442 thereof.

The IR cut filter 460 is made of glass and located between the fourth lens element 440 and the image plane 450, and will not affect the focal length of the optical image system.

The equation of the aspheric surface profiles of the above lens elements of the fourth embodiment is the same as that of the first embodiment, and will not be stated herein again.

In the optical image system according to the fourth embodiment, the definitions of f, Fno, HFOV, V1, V3, CT1, CT2, CT3, CT4, T23, R1, R3, R5, R6, f1, f2, SL, TTL and Imgh are the same as those stated in the first embodiment with corresponding values for the fourth embodiment, and they have the following values and satisfy the following relationships:

| | | | |
|---|---|---|---|
| F | 4.33 | f/R3 | 0.05 |
| FNO | 2.50 | (R5 − R6)/(R5 + R6) | −0.31 |
| HFOV | 37.1 | f/f1 | 0.97 |
| V1 − V3 | 32.1 | f/f2 | 0.52 |
| CT2/T23 | 1.00 | SL/TTL | 0.95 |
| (CT1 + CT2 + CT3)/CT4 | 1.09 | TTL/Imgh | 1.83 |
| R1/f | 0.89 | | |

The detailed optical data of the fourth embodiment are shown in Table 7 and the aspheric surface data are shown in Table 8 below.

TABLE 7

4th Embodiment
f = 4.33 mm, Fno = 2.50, HFOV = 37.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.840400 (ASP) | 0.419 | Plastic | 1.544 | 55.9 | 4.45 |
| 2 | | −6.305400 (ASP) | −0.085 | | | | |
| 3 | Ape. Stop | Plano | 0.228 | | | | |
| 4 | Lens 2 | 81.967200 (ASP) | 0.573 | Plastic | 1.544 | 55.9 | 8.36 |
| 5 | | −4.806300 (ASP) | 0.574 | | | | |
| 6 | Lens 3 | −0.669300 (ASP) | 0.483 | Plastic | 1.634 | 23.8 | −3.21 |
| 7 | | −1.276100 (ASP) | 0.406 | | | | |
| 8 | Lens 4 | 2.160340 (ASP) | 1.350 | Plastic | 1.543 | 56.5 | 4.64 |
| 9 | | 11.709200 (ASP) | 1.000 | | | | |
| 10 | IR-filter | Plano | 0.400 | Glass | 1.516 | 64.1 | — |
| 11 | | Plano | 0.840 | | | | |
| 12 | Image | Plano | — | | | | |

Note:
Reference wavelength (d-line) is 587.6 nm

TABLE 8

Aspheric Coefficients

| | Surface # | | | |
|---|---|---|---|---|
| | 1 | 2 | 4 | 5 |
| k = | −1.00000E+00 | 2.08532E+01 | −1.00000E+00 | −3.82173E+01 |
| A4 = | −8.36401E−02 | −1.32167E−02 | 1.13295E−01 | −1.47887E−02 |
| A6 = | −1.65856E−02 | −7.59235E−02 | −3.28605E−02 | −1.55913E−02 |
| A8 = | −5.80485E−02 | −4.02171E−02 | −8.47061E−02 | −6.82241E−02 |
| A10 = | −2.19445E−02 | 3.55208E−02 | 9.98757E−02 | 1.98242E−02 |
| A12 = | 1.97261E−02 | | −2.84446E−02 | −7.95527E−03 |
| A14 = | | | | 1.29402E−02 |

| | Surface # | | | |
|---|---|---|---|---|
| | 6 | 7 | 8 | 9 |
| k = | −1.95347E+00 | −1.01089E+00 | −8.32395E+00 | −1.00000E+00 |
| A4 = | −1.87789E−01 | 4.69178E−02 | −6.76840E−03 | −1.47002E−02 |
| A6 = | 1.28567E−01 | 2.02097E−02 | 2.54808E−03 | 2.17970E−03 |
| A8 = | −9.73907E−04 | 1.79616E−02 | −6.33500E−04 | −2.54821E−04 |
| A10 = | −3.20033E−02 | 1.40435E−03 | 1.05767E−04 | 1.23322E−05 |
| A12 = | 1.28878E−02 | −2.79620E−03 | −1.01653E−05 | −5.98197E−07 |
| A14 = | | −1.58698E−04 | 5.09800E−07 | 1.70449E−07 |
| A16 = | | | −1.21534E−08 | −1.38059E−08 |

Figure 9:
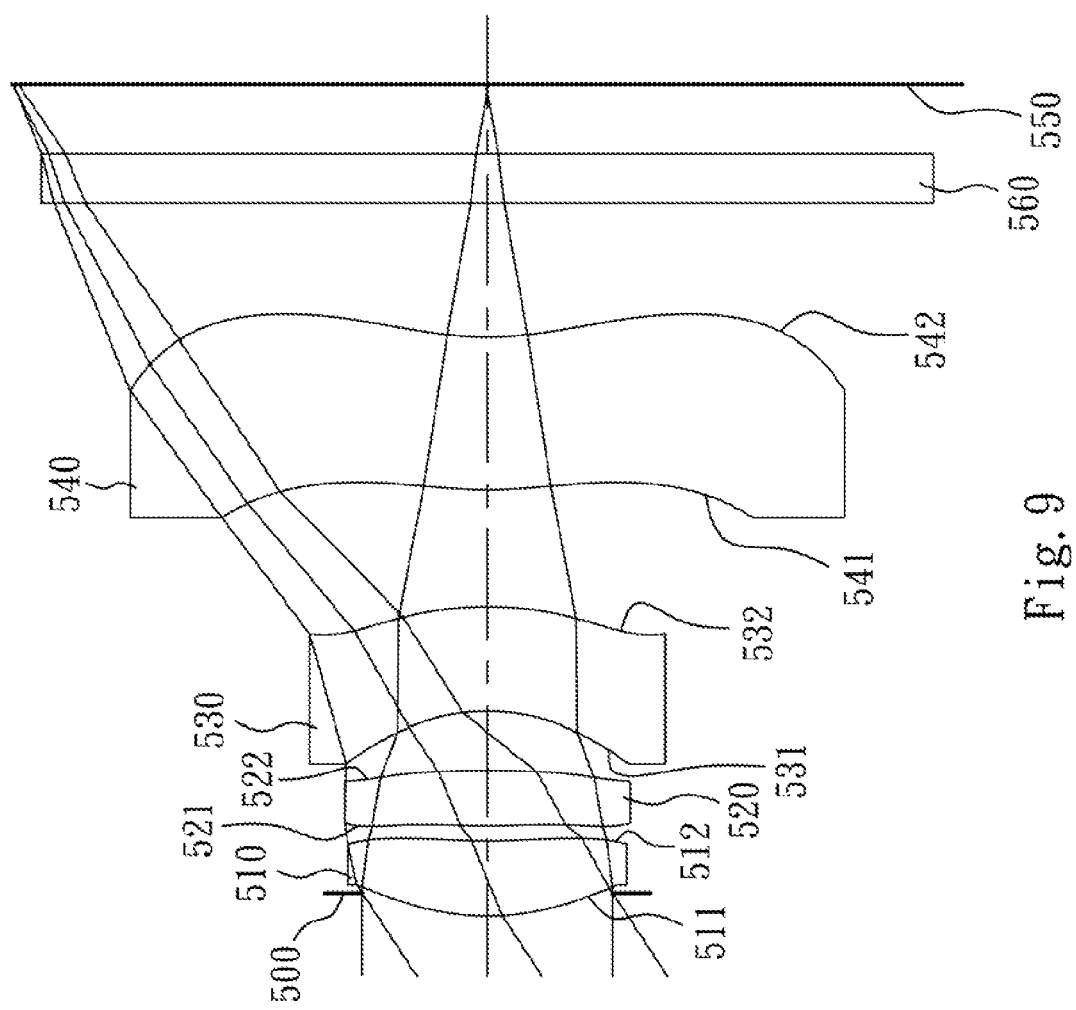
FIG. 9 is a schematic view of an optical image system according to the fifth embodiment of the present disclosure.
Figure 10:
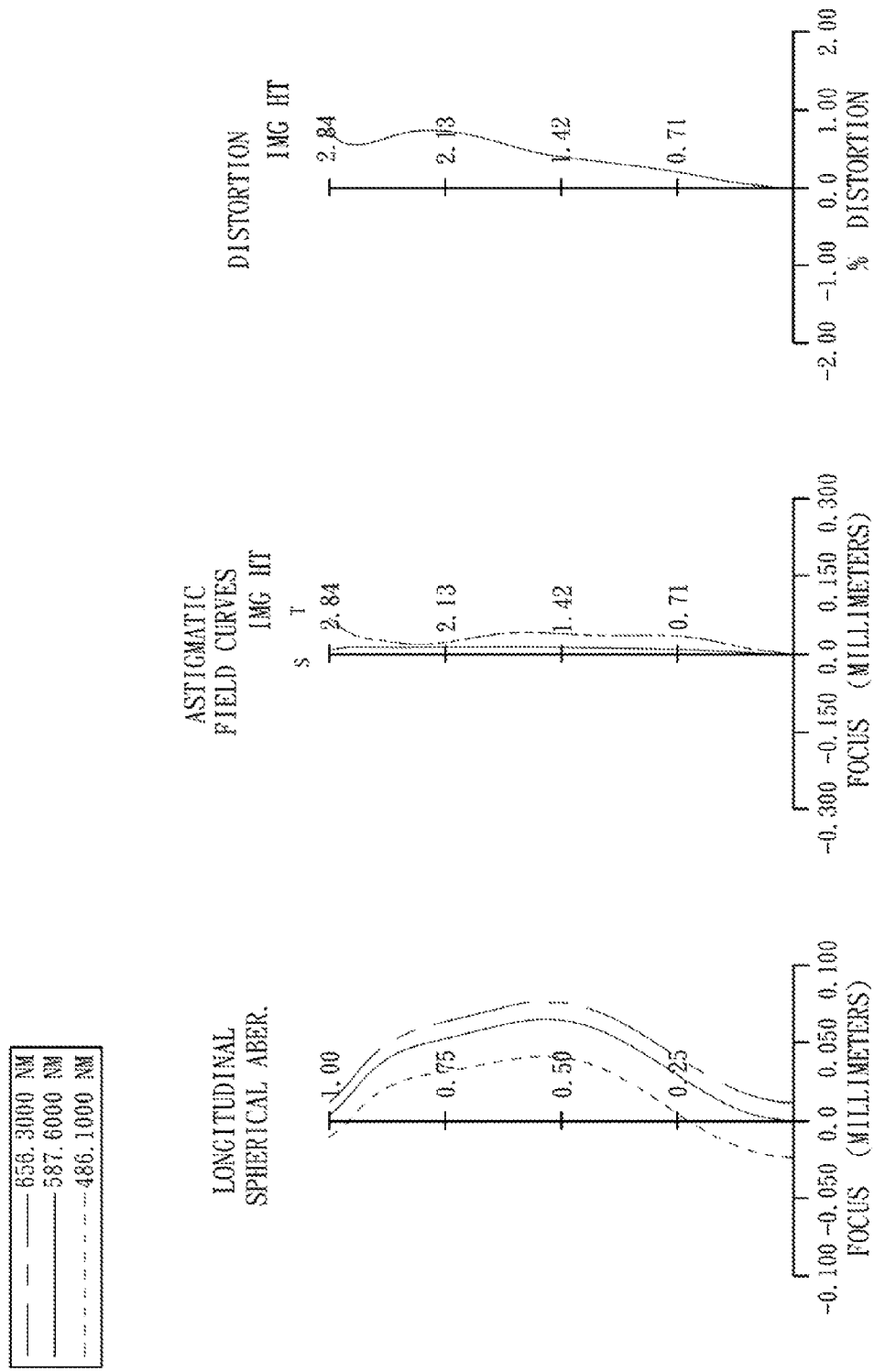
FIG. 10 shows spherical aberration curves, astigmatic field curves and a distortion curve of the optical image system according to the fifth embodiment.

FIG. 9 is a schematic view of an optical image system according to the fifth embodiment of the present disclosure. FIG. 10 shows spherical aberration curves, astigmatic field curves and a distortion curve of the optical image system according to the fifth embodiment. In FIG. 9, the optical image system includes, in order from an object side to an image side, an aperture stop 500, the first lens element 510, the second lens element 520, the third lens element 530, the fourth lens element 540, an IR (infrared) cut filter 560 and an image plane 550.

The first lens element 510 is made of plastic material. The first lens element 510 with positive refractive power has a convex object-side surface 511 and a concave image-side surface 512. The object-side surface 511 and the image-side surface 512 of the first lens element 510 are aspheric.

The second lens element 520 is made of plastic material. The second lens element 520 with positive refractive power has a convex object-side surface 521 and a convex image-side surface 522. The object-side surface 521 and the image-side surface 522 of the second lens element 520 are aspheric.

The third lens element 530 is made of plastic material. The third lens element 530 with negative refractive power has a concave object-side surface 531 and a convex image-side surface 532. The object-side surface 531 and the image-side surface 532 of the third lens element 530 are aspheric.

The fourth lens element 540 is made of plastic material. The fourth lens element 540 with negative refractive power has a convex object-side surface 541 and a concave image-side surface 542. The object-side surface 541 and the image-side surface 542 of the fourth lens element 540 are aspheric. The fourth lens element 540 has inflection points formed on the object-side surface is 541 and the image-side surface 542 thereof.

The IR cut filter 560 is made of glass and located between the fourth lens element 540 and the image plane 550, and will not affect the focal length of the optical image system.

The equation of the aspheric surface profiles of the above lens elements of the fifth embodiment is the same as that of the first embodiment, and will not be stated herein again.

In the optical image system according to the fifth embodiment, the definitions of f, Fno, HFOV, V1, V3, CT1, CT2, CT3, CT4, T23, R1, R3, R5, R6, f1, f2, SL, TTL and Imgh are the same as those stated in the first embodiment with corresponding values for the fifth embodiment, and they have the following values and satisfy the following relationships:

| F | 4.27 | f/R3 | 0.74 |
|---|------|------|------|
| FNO | 2.85 | (R5 − R6)/(R5 + R6) | −0.25 |
| HFOV | 33.2 | f/f1 | 1.04 |
| V1 − V3 | 32.1 | f/f2 | 0.59 |
| CT2/T23 | 0.94 | SL/TTL | 0.97 |
| (CT1 + CT2 + CT3)/CT4 | 1.55 | TTL/Imgh | 1.72 |
| R1/f | 0.36 | | |

The detailed optical data of the fifth embodiment are shown in Table 9 and the aspheric surface data are shown in Table 10 below.

TABLE 9

5th Embodiment
f = 4.27 mm, Fno = 2.85, HFOV = 33.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.138 | | | | |
| 2 | Lens 1 | 1.518400 (ASP) | 0.449 | Plastic | 1.544 | 55.9 | 4.12 |
| 3 | | 4.219600 (ASP) | 0.090 | | | | |
| 4 | Lens 2 | 5.811900 (ASP) | 0.332 | Plastic | 1.544 | 55.9 | 7.21 |
| 5 | | −11.805300 (ASP) | 0.353 | | | | |
| 6 | Lens 3 | −1.274390 (ASP) | 0.628 | Plastic | 1.634 | 23.8 | −7.00 |
| 7 | | −2.130080 (ASP) | 0.700 | | | | |
| 8 | Lens 4 | 2.775810 (ASP) | 0.909 | Plastic | 1.535 | 56.3 | −20.00 |
| 9 | | 1.952260 (ASP) | 0.800 | | | | |
| 10 | IR-filter | Plano | 0.300 | Glass | 1.516 | 64.1 | — |
| 11 | | Plano | 0.411 | | | | |
| 12 | Image | Plano | — | | | | |

Note:
Reference wavelength (d-line) is 587.6 nm

TABLE 10

Aspheric Coefficients

| | Surface # | | | |
|---|---|---|---|---|
| | 2 | 3 | 4 | 5 |
| k = | −8.28489E−01 | 2.04340E+01 | −1.00000E+00 | −1.00000E+00 |
| A4 = | −4.17232E−03 | −2.81536E−01 | −3.48322E−01 | −2.48780E−01 |
| A6 = | −1.16440E−02 | −7.35904E−02 | 1.47661E−01 | 1.33934E−01 |
| A8 = | 6.13370E−02 | 4.21295E−01 | 4.60434E−01 | 4.66328E−01 |
| A10 = | −3.20118E−01 | −3.45768E−01 | −6.15996E−02 | −6.39847E−01 |
| A12 = | 1.92449E−01 | −1.98551E−01 | −1.79860E−01 | 4.08078E−01 |
| A14 = | 1.38137E−01 | −9.43650E−02 | −5.27306E−01 | 1.44378E−02 |
| A16 = | −3.34711E−01 | 1.98731E−01 | 6.02797E−01 | −2.11255E−01 |

| | Surface # | | | |
|---|---|---|---|---|
| | 6 | 7 | 8 | 9 |
| k = | −5.60155E+00 | −2.32323E−01 | −2.24342E+01 | −9.49079E+00 |
| A4 = | −5.33441E−01 | −1.07852E−01 | −1.34865E−01 | −7.27123E−02 |
| A6 = | 7.52222E−01 | 2.56341E−01 | 5.56260E−02 | 2.21117E−02 |
| A8 = | −3.60267E−01 | −1.12998E−01 | −1.13877E−02 | −5.30168E−03 |
| A10 = | −1.56123E−01 | 7.62418E−02 | 2.05673E−04 | 5.83271E−04 |
| A12 = | 1.30741E−01 | −2.08037E−02 | −1.00536E−04 | −1.09477E−05 |
| A14 = | 1.72701E−01 | −3.71884E−02 | −9.93958E−05 | −6.60455E−06 |
| A16 = | −3.37540E−01 | 2.25213E−02 | 5.34325E−05 | 3.53320E−07 |

Figure 11:
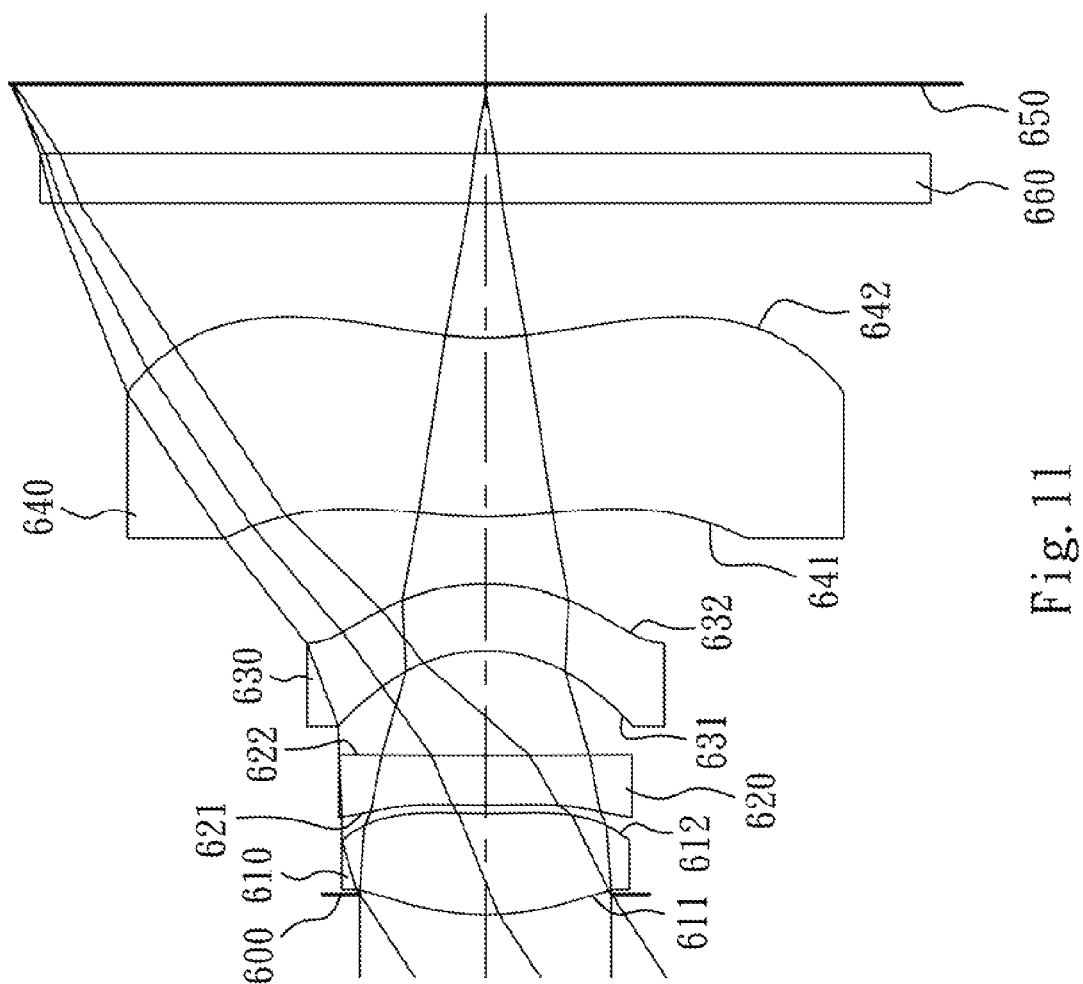
FIG. 11 is a schematic view of an optical image system according to the sixth embodiment of the present disclosure.
Figure 12:
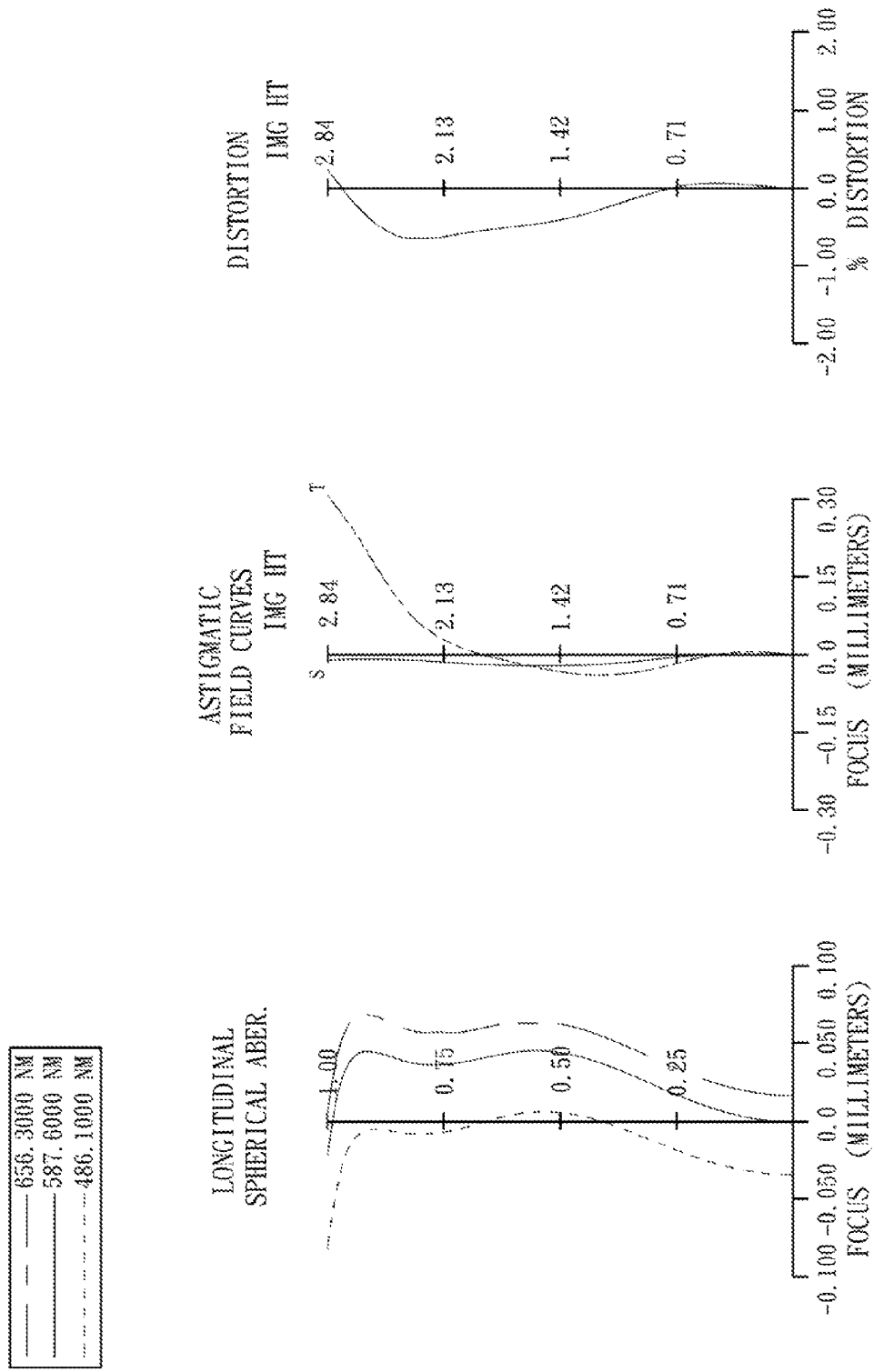
FIG. 12 shows spherical aberration curves, astigmatic field curves and a distortion curve of the optical image system according to the sixth embodiment.

FIG. 11 is a schematic view of an optical image system according to the sixth embodiment of the present disclosure. FIG. 12 shows spherical aberration curves, astigmatic field curves and a distortion curve of the optical image system according to the sixth embodiment. In FIG. 11, the optical image system includes, in order from an object side to an image side, an aperture stop 600, the first lens element 610, the second lens element 620, the third lens element 630, the fourth lens element 640, an IR (infrared) cut filter 660 and an image plane 650.

The first lens element 610 is made of plastic material. The first lens element 610 with positive refractive power has a convex object-side surface 611 and a concave image-side surface 612. The object-side surface 611 and the image-side surface 612 of the first lens element 610 are aspheric.

The second lens element 620 is made of plastic material. The second lens element 620 with positive refractive power has a convex object-side surface 621 and a concave image-side surface 622. The object-side surface 621 and the image-side surface 622 of the second lens element 620 are aspheric.

The third lens element 630 is made of plastic material. The third lens element 630 with negative refractive power has a concave object-side surface 631 and a convex image-side surface 632. The object-side surface 631 and the image-side surface 632 of the third lens element 630 are aspheric.

The fourth lens element 640 is made of plastic material. The fourth lens element 640 with negative refractive power has a convex object-side surface 641 and a concave image-side surface 642. The object-side surface 641 and the image-side surface 642 of the fourth lens element 640 are aspheric. The fourth lens element 640 has inflection points formed on the object-side surface 641 and the image-side surface 642 thereof.

The IR cut filter 660 is made of glass and located between the fourth lens element 640 and the image plane 650, and will not affect the focal length of the optical image system.

The equation of the aspheric surface profiles of the above lens elements of the sixth embodiment is the same as that of the first embodiment, and will not be stated herein again.

In the optical image system according to the sixth embodiment, the definitions of f, Fno, HFOV, V1, V3, CT1, CT2, CT3, CT4, T23, R1, R3, R5, R6, f1, f2, SL, TTL and Imgh are the same as those stated in the first embodiment with corresponding values for the sixth embodiment, and they have the following values and satisfy the following relationships:

| F | 4.28 | f/R3 | 0.67 |
|---|---|---|---|
| FNO | 2.85 | (R5 − R6)/(R5 + R6) | −0.18 |
| HFOV | 33.3 | f/f1 | 1.06 |
| V1 − V3 | 32.5 | f/f2 | 0.32 |
| CT2/T23 | 0.48 | SL/TTL | 0.97 |
| (CT1 + CT2 + CT3)/CT4 | 1.22 | TTL/Imgh | 1.71 |
| R1/f | 0.38 | | |

The detailed optical data of the sixth embodiment are shown in Table 11 and the aspheric surface data are shown in Table 12 below.

TABLE 11

6th Embodiment
f = 4.28 mm, Fno = 2.85, HFOV = 33.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.124 | | | | |
| 2 | Lens 1 | 1.614470 (ASP) | 0.604 | Plastic | 1.544 | 55.9 | 4.03 |
| 3 | | 5.306100 (ASP) | 0.050 | | | | |
| 4 | Lens 2 | 6.395600 (ASP) | 0.300 | Plastic | 1.544 | 55.9 | 13.55 |
| 5 | | 47.393400 (ASP) | 0.621 | | | | |
| 6 | Lens 3 | −0.947310 (ASP) | 0.401 | Plastic | 1.632 | 23.4 | −8.19 |
| 7 | | −1.349690 (ASP) | 0.401 | | | | |
| 8 | Lens 4 | 2.594430 (ASP) | 1.070 | Plastic | 1.544 | 55.9 | −117.95 |
| 9 | | 2.131220 (ASP) | 0.800 | | | | |
| 10 | IR-filter | Plano | 0.300 | Glass | 1.516 | 64.1 | — |
| 11 | | Plano | 0.414 | | | | |
| 12 | Image | Plano | — | | | | |

Note:
Reference wavelength (d-line) is 587.6 nm

TABLE 12

Aspheric Coefficients

| | Surface # | | | |
|---|---|---|---|---|
| | 2 | 3 | 4 | 5 |
| k = | −1.35102E+00 | −1.00000E+00 | −1.00000E+00 | 1.00000E+01 |
| A4 = | −2.06513E−02 | −5.21844E−01 | −4.95537E−01 | −5.05792E−02 |
| A6 = | −2.05216E−02 | −2.86916E−02 | 1.18240E−01 | 9.32459E−02 |
| A8 = | 1.07983E−01 | 5.90663E−01 | 6.02079E−01 | 1.06922E−01 |
| A10 = | −4.78369E−01 | −3.96454E−01 | −2.07234E−01 | −4.27892E−01 |
| A12 = | 1.93390E−01 | −1.98789E−01 | −1.80119E−01 | 4.08541E−01 |
| A14 = | 1.39943E−01 | −9.49336E−02 | −5.28239E−01 | 1.53861E−02 |
| A16 = | −3.32217E−01 | 1.96850E−01 | 5.99525E−01 | −2.09721E−01 |

TABLE 12-continued

Aspheric Coefficients

| Surface # | | | |
|---|---|---|---|
| 6 | 7 | 8 | 9 |
| k = −5.08322E+00 | −6.54123E−01 | −2.96752E+01 | −1.14591E+01 |
| A4 = −6.00800E−01 | −1.07435E−01 | −1.12197E−01 | −6.43889E−02 |
| A6 = 6.16625E−01 | 1.50357E−01 | 4.24188E−02 | 1.76053E−02 |
| A8 = −5.74393E−01 | −1.07933E−01 | −1.21945E−02 | −4.52218E−03 |
| A10 = 2.85017E−01 | 1.36988E−01 | 1.07456E−03 | 4.81208E−04 |
| A12 = 1.30774E−01 | 1.45297E−03 | 3.05246E−04 | −3.95752E−06 |
| A14 = 1.72731E−01 | −4.14221E−02 | −3.59234E−05 | −4.08105E−07 |
| A16 = −3.37538E−01 | 1.04626E−02 | −1.60375E−06 | −4.72349E−07 |

Figure 13:
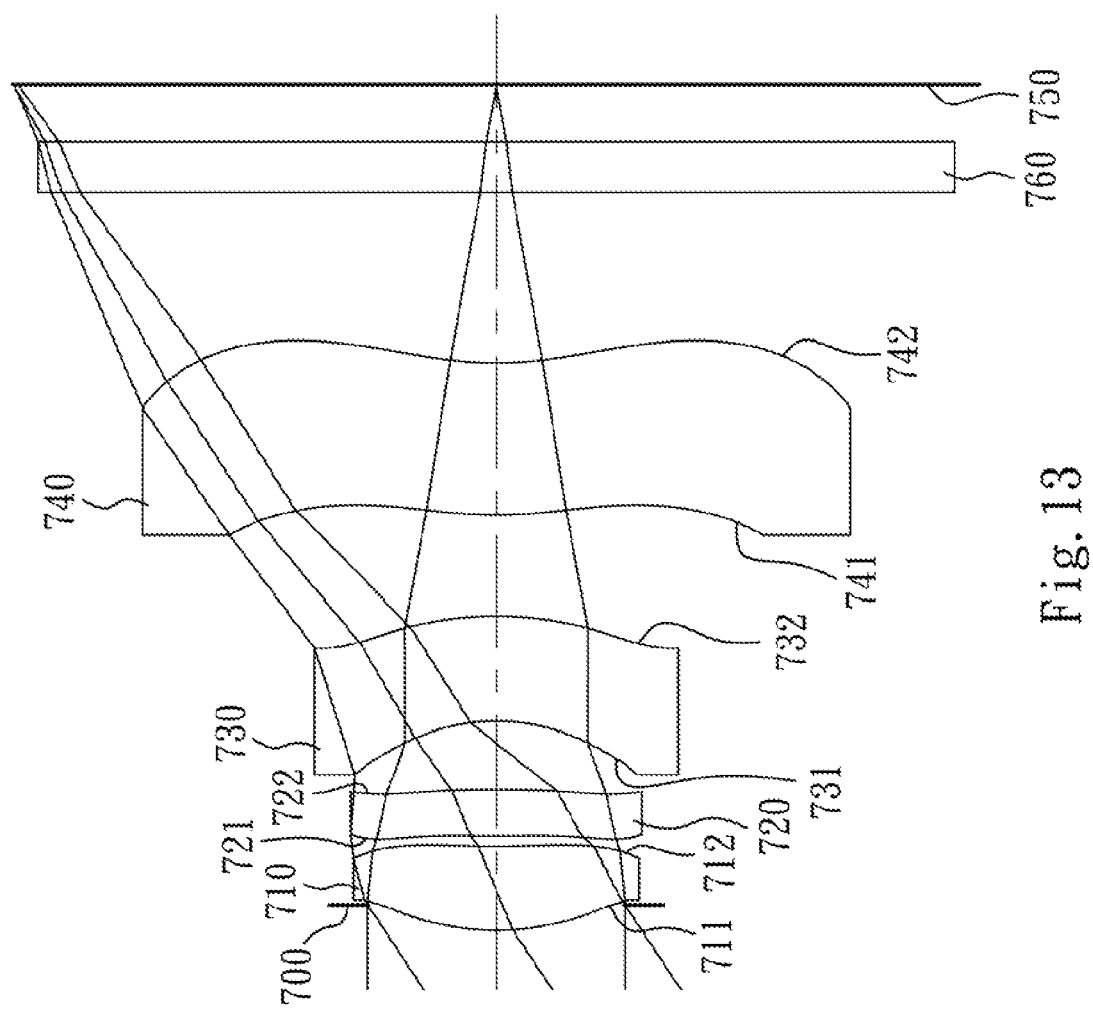
FIG. 13 is a schematic view of an optical image system according to the seventh embodiment of the present disclosure.
Figure 14:
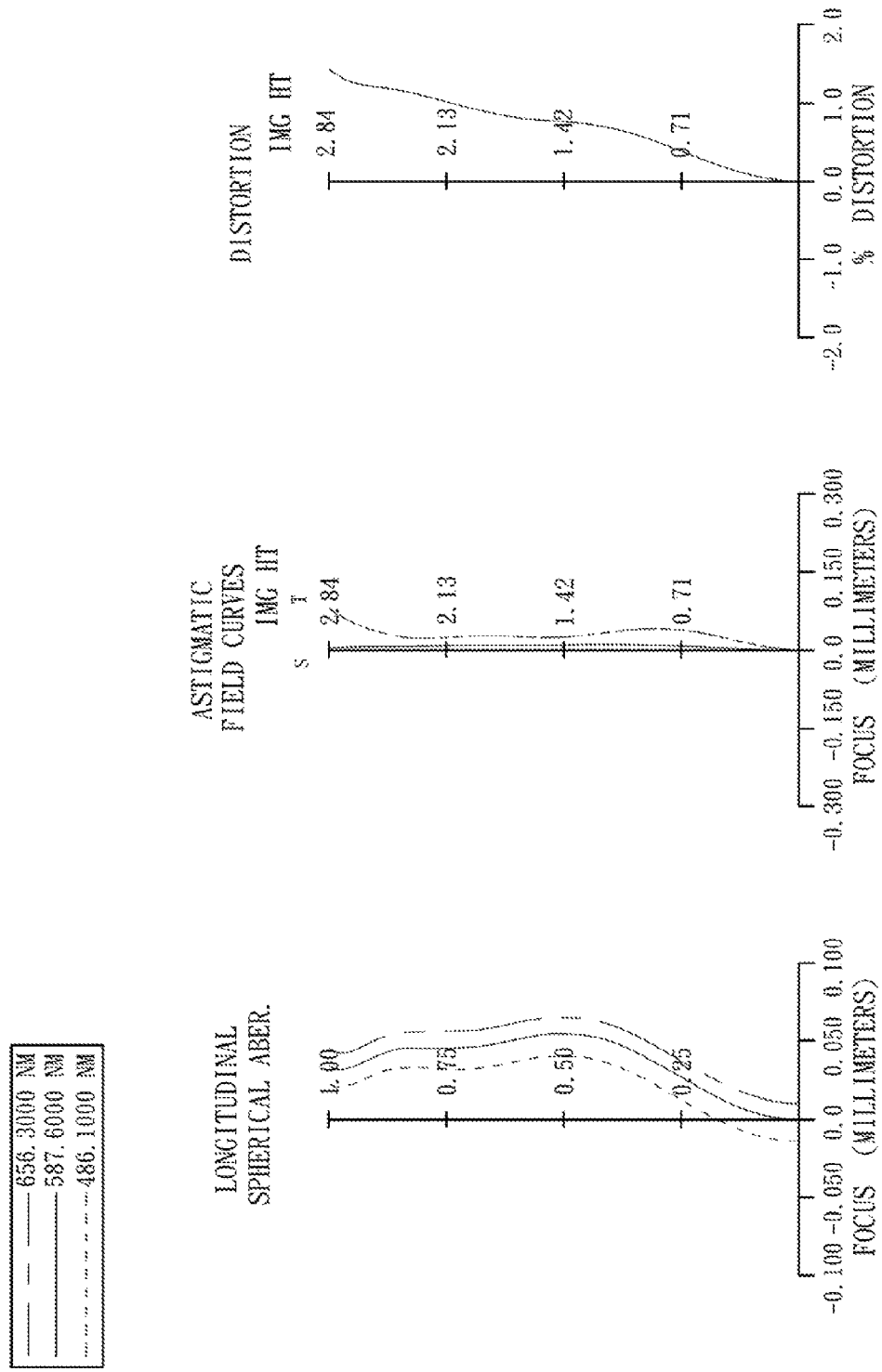
FIG. 14 shows spherical aberration curves, astigmatic field curves and a distortion curve of the optical image system according to the seventh embodiment.

FIG. 13 is a schematic view of an optical image system according to the seventh embodiment of the present disclosure. FIG. 14 shows spherical aberration curves, astigmatic field curves and a distortion curve of the optical image system according to the seventh embodiment. In FIG. 13, the optical image system includes, in order from an object side to an image side, an aperture stop 700, the first lens element 710, the second lens element 720, the third lens element 730, the fourth lens element 740, an IR (infrared) cut filter 760 and an image plane 750.

The first lens element 710 is made of plastic material. The first lens element 710 with positive refractive power has a convex object-side surface 711 and a concave image-side surface 712. The object-side surface 711 and the image-side surface 712 of the first lens element 710 are aspheric.

The second lens element 720 is made of plastic material. The second lens element 720 with positive refractive power has a convex object-side surface 721 and a convex image-side surface 722. The object-side surface 721 and the image-side surface 722 of the second lens element 720 are aspheric.

The third lens element 730 is made of plastic material. The third lens element 730 with negative refractive power has a concave object-side surface 731 and a convex image-side surface 732. The object-side surface 731 and the image-side surface 732 of the third lens element 730 are aspheric.

The fourth lens element 740 is made of plastic material. The fourth lens element 740 with negative refractive power has a convex object-side surface 741 and a concave image-side surface 742. The object-side surface 741 and the image-side surface 742 of the fourth lens element 740 are aspheric.

The fourth lens element 740 has inflection points formed on the object-side surface 741 and the image-side surface 742 thereof.

The IR cut filter 760 is made of glass and located between the fourth lens element 740 and the image plane 750, and will not affect the focal length of the optical image system.

The equation of the aspheric surface profiles of the above lens elements of the seventh embodiment is the same as that of the first embodiment, and will not be stated herein again.

In the optical image system according to the seventh embodiment, the definitions of f, Fno, HFOV, V1, V3, CT1, CT2, CT3, CT4, T23, R1, R3, R5, R6, f1, f2, SL, TTL and Imgh are the same as those stated in the first embodiment with corresponding values for the seventh embodiment, and they have the following values and satisfy the following relationships:

| F | 4.23 | f/R3 | 0.33 |
|---|---|---|---|
| FNO | 2.80 | (R5 − R6)/(R5 + R6) | −0.28 |
| HFOV | 33.3 | f/f1 | 1.14 |
| V1 − V3 | 34.5 | f/f2 | 0.45 |
| CT2/T23 | 0.68 | SL/TTL | 0.97 |
| (CT1 + CT2 + CT3)/CT4 | 1.55 | TTL/Imgh | 1.72 |
| R1/f | 0.35 | | |

The detailed optical data of the seventh embodiment are shown in Table 13 and the aspheric surface data are shown in Table 14 below.

TABLE 13

7th Embodiment
f = 4.23 mm, Fno = 2.80, HFOV = 33.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.150 | | | | |
| 2 | Lens 1 | 1.493000 (ASP) | 0.493 | Plastic | 1.544 | 55.9 | 3.72 |
| 3 | | 5.014700 (ASP) | 0.060 | | | | |
| 4 | Lens 2 | 12.766400 (ASP) | 0.275 | Plastic | 1.544 | 55.9 | 9.47 |
| 5 | | −8.569400 (ASP) | 0.402 | | | | |
| 6 | Lens 3 | −1.253780 (ASP) | 0.620 | Plastic | 1.650 | 21.4 | −5.93 |
| 7 | | −2.220940 (ASP) | 0.595 | | | | |
| 8 | Lens 4 | 2.362650 (ASP) | 0.895 | Plastic | 1.544 | 55.9 | −2159.54 |
| 9 | | 2.043150 (ASP) | 1.000 | | | | |
| 10 | IR-filter | Plano | 0.300 | Glass | 1.516 | 64.1 | — |
| 11 | | Plano | 0.334 | | | | |
| 12 | Image | Plano | — | | | | |

Note:
Reference wavelength (d-line) is 587.6 nm

TABLE 14

Aspheric Coefficients

| Surface # | 2 | 3 | 4 | 5 |
|---|---|---|---|---|
| k = | −8.27863E−01 | 2.07653E+01 | −2.74900E+02 | −1.00000E+00 |
| A4 = | −2.36627E−03 | −3.20616E−01 | −3.50710E−01 | −1.69172E−01 |
| A6 = | −2.06520E−02 | −1.31133E−01 | 2.19363E−01 | 2.68240E−01 |
| A8 = | 6.71879E−02 | 4.69845E−01 | 5.57827E−01 | 4.54639E−01 |
| A10 = | −4.65335E−01 | −2.69503E−01 | −1.06159E−01 | −7.23793E−01 |
| A12 = | 2.37628E−01 | −2.17433E−01 | −2.94214E−01 | 3.39222E−01 |
| A14 = | 1.38137E−01 | −9.49384E−02 | −4.87397E−01 | 1.40351E−02 |
| A16 = | −3.34711E−01 | 1.98731E−01 | 6.09278E−01 | −2.11255E−01 |

| Surface # | 6 | 7 | 8 | 9 |
|---|---|---|---|---|
| k = | −5.55560E+00 | 4.43685E−01 | −1.35233E+01 | −8.01427E+00 |
| A4 = | −5.06381E−01 | −1.29094E−01 | −1.46738E−01 | −8.12410E−02 |
| A6 = | 7.20372E−01 | 2.49296E−01 | 5.70781E−02 | 2.34216E−02 |
| A8 = | −4.71887E−01 | −1.10800E−01 | −1.04530E−02 | −5.14520E−03 |
| A10 = | 1.34561E−01 | 8.21813E−02 | 2.18394E−04 | 5.37410E−04 |
| A12 = | −1.46536E−01 | −2.26710E−02 | −1.22095E−04 | −1.59629E−05 |
| A14 = | 1.78180E−01 | −3.79752E−02 | −1.12987E−04 | −4.16651E−06 |
| A16 = | −3.37540E−01 | 2.32989E−02 | 5.64775E−05 | 1.53811E−07 |

Figure 15:
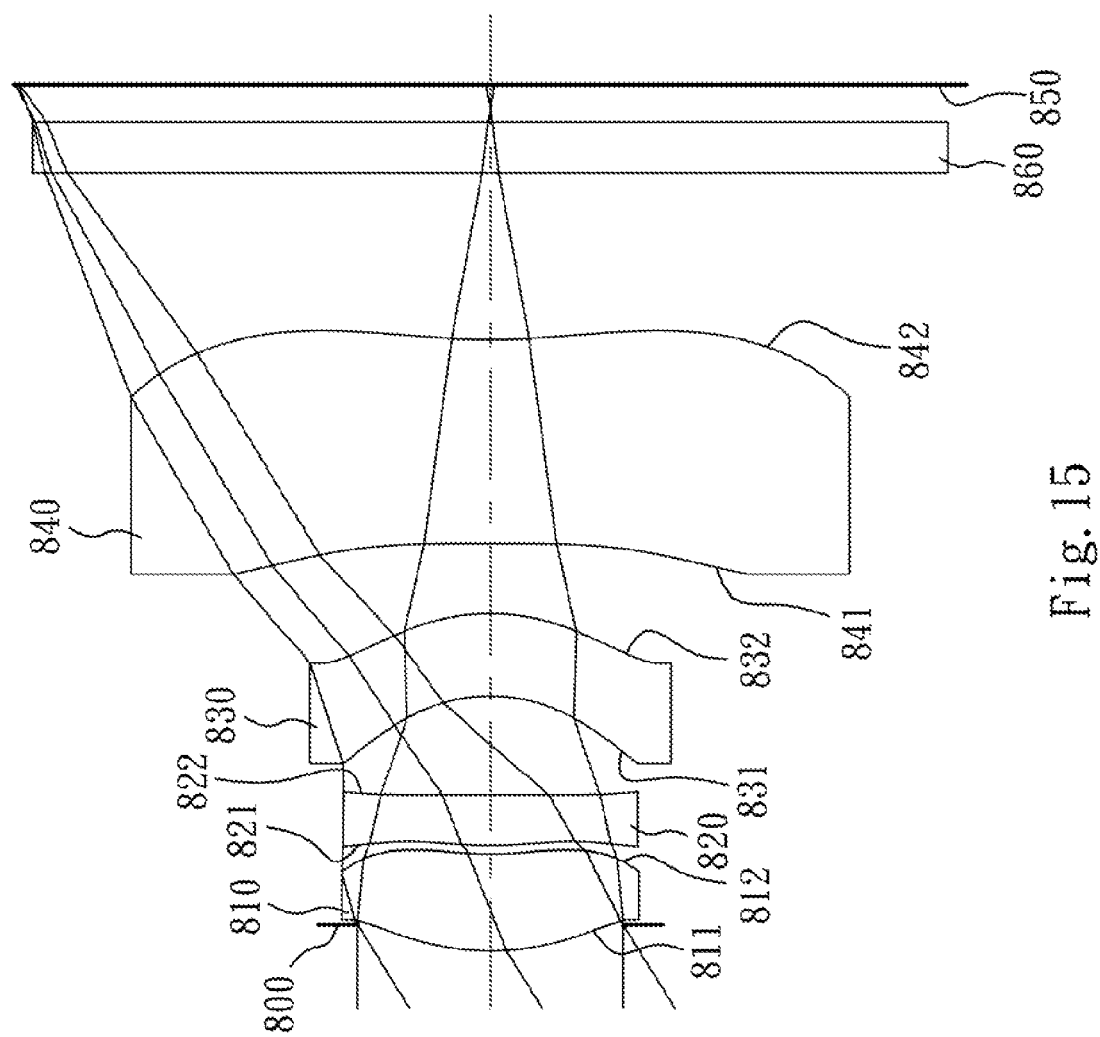
FIG. 15 is a schematic view of an optical image system according to the eighth embodiment of the present disclosure.
Figure 16:
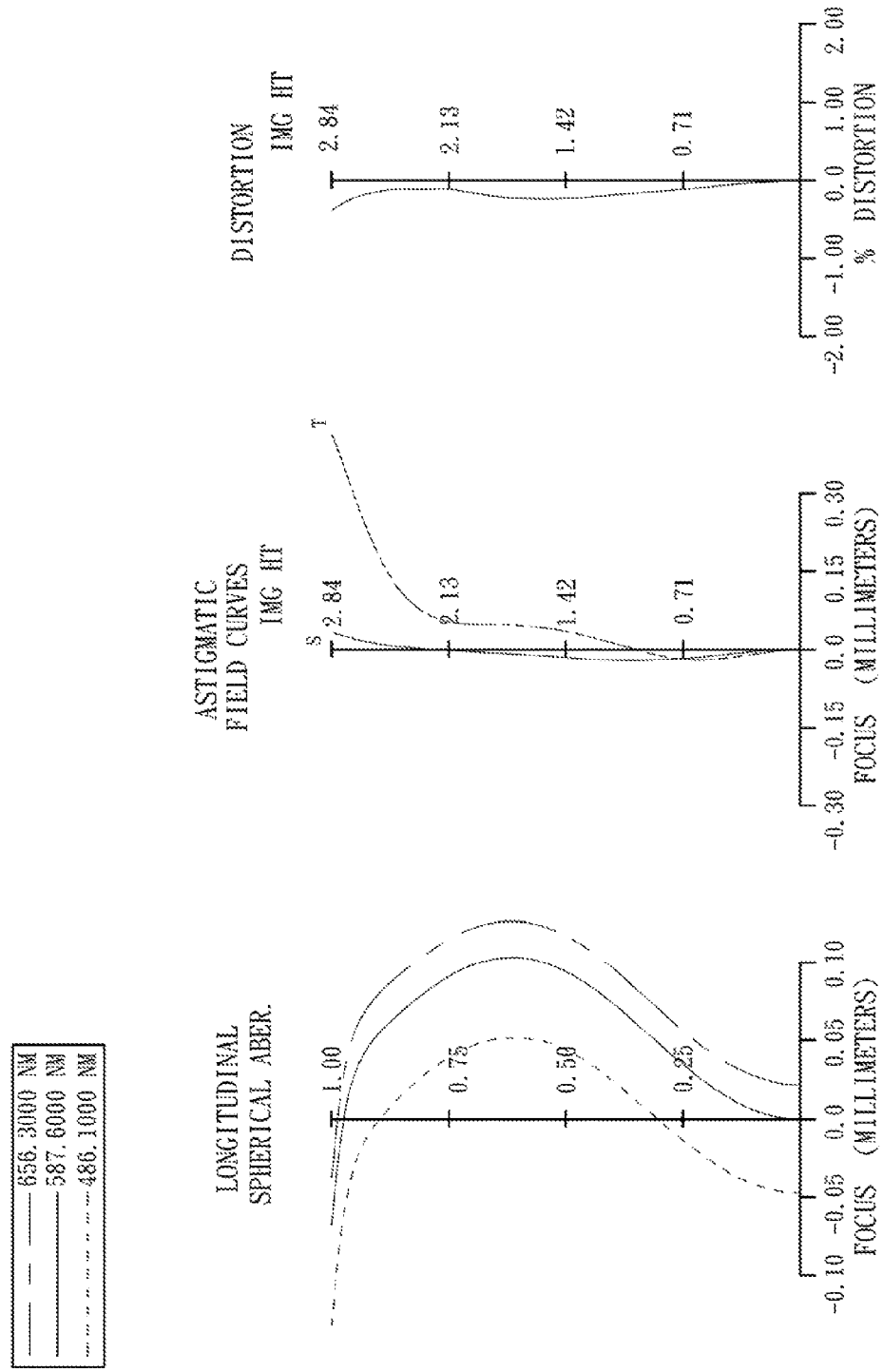
FIG. 16 shows spherical aberration curves, astigmatic field curves and a distortion curve of the optical image system according to the eighth embodiment.

FIG. 15 is a schematic view of an optical image system according to the eighth embodiment of the present disclosure. FIG. 16 shows spherical aberration curves, astigmatic field curves and a distortion curve of the optical image system according to the eighth embodiment. In FIG. 15, the optical image system includes, in order from an object side to an image side, an aperture stop 800, the first lens element 810, the second lens element 820, the third lens element 830, the fourth lens element 840, an IR (infrared) cut filter 860 and an image plane 850.

The first lens element 810 is made of plastic material. The first lens element 810 with positive refractive power has a convex object-side surface 811 and a concave image-side surface 812. The object-side surface 811 and the image-side surface 812 of the first lens element 810 are aspheric.

The second lens element 820 is made of plastic material. The second lens element 820 with positive refractive power has a convex object-side surface 821 and a concave image-side surface 822. The object-side surface 821 and the image-side surface 822 of the second lens element 820 are aspheric.

The third lens element 830 is made of plastic material. The third lens element 830 with negative refractive power has a concave object-side surface 831 and a convex image-side surface 832. The object-side surface 831 and the image-side surface 832 of the third lens element 830 are aspheric.

The fourth lens element 840 is made of plastic material. The fourth lens element 840 with negative refractive power has a concave object-side surface 841 and a concave image-side surface 842. The object-side surface 841 and the image-side surface 842 of the fourth lens element 840 are aspheric. The fourth lens element 840 has inflection points formed on the object-side surface 841 and the image-side surface 842 thereof.

The IR cut filter 860 is made of glass and located between the fourth lens element 840 and the image plane 850, and will not affect the focal length of the optical image system.

The equation of the aspheric surface profiles of the above lens elements of the eighth embodiment is the same as that of the first embodiment, and will not be stated herein again.

In the optical image system according to the eighth embodiment, the definitions of f, Fno, HFOV, V1, V3, CT1, CT2, CT3, CT4, T23, R1, R3, R5, R6, f1, f2, SL, TTL and Imgh are the same as those stated in the first embodiment with corresponding values for the eighth embodiment, and they have the following values and satisfy the following relationships:

| | | | |
|---|---|---|---|
| f | 4.52 | f/R3 | 1.86 |
| FNO | 2.85 | (R5 − R6)/(R5 + R6) | −0.11 |
| HFOV | 31.8 | f/f1 | 0.69 |
| V1 − V3 | 32.5 | f/f2 | 0.92 |
| CT2/T23 | 0.51 | SL/TTL | 0.97 |
| (CT1 + CT2 + CT3)/CT4 | 1.13 | TTL/Imgh | 1.79 |
| R1/f | 0.34 | | |

The detailed optical data of the eighth embodiment are shown in Table 15 and the aspheric surface data are shown in Table 16 below.

TABLE 15

8th Embodiment
f = 4.52 mm, Fno = 2.85, HFOV = 31.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.156 | | | | |
| 2 | Lens 1 | 1.513760 (ASP) | 0.581 | Plastic | 1.544 | 55.9 | 6.56 |
| 3 | | 2.271710 (ASP) | 0.050 | | | | |

TABLE 15-continued

8th Embodiment
f = 4.52 mm, Fno = 2.85, HFOV = 31.8 deg.

| Surface # | | Curvature Radius | Thickness | Material | Index | Abbe # | Focal length |
|---|---|---|---|---|---|---|---|
| 4 | Lens 2 | 2.427640 (ASP) | 0.300 | Plastic | 1.544 | 55.9 | 4.91 |
| 5 | | 25.550800 (ASP) | 0.592 | | | | |
| 6 | Lens 3 | −1.006520 (ASP) | 0.497 | Plastic | 1.632 | 23.4 | −40.49 |
| 7 | | −1.248100 (ASP) | 0.415 | | | | |
| 8 | Lens 4 | −90.909100 (ASP) | 1.221 | Plastic | 1.544 | 55.9 | −7.40 |
| 9 | | 4.234000 (ASP) | 1.000 | | | | |
| 10 | IR-filter | Plano | 0.300 | Glass | 1.516 | 64.1 | — |
| 11 | | Plano | 0.224 | | | | |
| 12 | Image | Plano | — | | | | |

Note:
Reference wavelength (d-line) is 587.6 nm

TABLE 16

Aspheric Coefficients

| | Surface # | | | |
|---|---|---|---|---|
| | 2 | 3 | 4 | 5 |
| k = | −1.26054E+00 | −1.00000E+00 | −1.00000E+00 | −1.00000E+02 |
| A4 = | −1.75645E−02 | −5.41182E−01 | −5.20170E−01 | −7.18267E−02 |
| A6 = | −1.76291E−02 | −5.05444E−02 | 9.26788E−02 | 8.84632E−02 |
| A8 = | 8.42397E−02 | 5.89008E−01 | 6.01068E−01 | 1.68945E−01 |
| A10 = | −3.36304E−01 | −3.64661E−01 | −2.30388E−01 | −4.21206E−01 |
| A12 = | 1.93360E−01 | −1.98810E−01 | −1.80203E−01 | 4.08468E−01 |
| A14 = | 1.39986E−01 | −9.48780E−02 | −5.28204E−01 | 1.53861E−02 |
| A16 = | −3.32217E−01 | 1.96850E−01 | 5.99525E−01 | −2.09721E−01 |

| | Surface # | | | |
|---|---|---|---|---|
| | 6 | 7 | 8 | 9 |
| k = | −4.41241E+00 | −1.31424E+00 | −8.21299E+03 | −1.46087E+00 |
| A4 = | −5.47287E−01 | −6.77227E−02 | −9.73987E−02 | −8.39283E−02 |
| A6 = | 6.92075E−01 | 1.64420E−01 | 4.71350E−02 | 2.28579E−02 |
| A8 = | −5.53837E−01 | −1.04269E−01 | −1.12022E−02 | −4.74492E−03 |
| A10 = | 2.00526E−01 | 1.23988E−01 | 1.01069E−03 | 4.53985E−04 |
| A12 = | 1.30715E−01 | 1.89820E−03 | 2.90724E−04 | −5.19948E−06 |
| A14 = | 1.72759E−01 | −4.42740E−02 | −6.09722E−05 | −1.07951E−06 |
| A16 = | −3.37538E−01 | 8.57958E−03 | −3.43193E−06 | −1.76875E−07 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image system comprising, in order from an object side to an image side:
    a first lens element with positive refractive power and having a convex object-side surface;
    a second lens element with positive refractive power;
    a third lens element with negative refractive power and having a concave object-side surface and a convex image-side surface, wherein the third lens element is made of plastic material, and the object-side surface and the image-side surface of the third lens element are aspheric; and
    a fourth lens element with refractive power and having a concave image-side surface, wherein the fourth lens element is made of plastic material, an object-side surface and the image-side surface of the fourth lens element are aspheric, and the fourth lens element has at least one inflection point formed on at least one of the object-side surface and the image-side surface thereof;
    wherein when a focal length of the optical image system is f, a focal length of the first lens element is f1, a focal length of the second lens element is f2, a central thickness of the second lens element is CT2, an axial distance between the second lens element and the third lens element is T23, a curvature radius of the object-side surface of the third lens element is R5 and a curvature radius of the image-side surface of the third lens element is R6, the following relationships are satisfied:

$0.5 < f/f1 < 1.5;$ $0 < f/f2 < 1.0;$ $0.2 < CT2/T23 < 1.1;$ and $-0.65 < (R5-R6)/(R5+R6) < -0.05.$ 2. The optical image system of claim 1, further comprising:
    a stop, wherein when an axial distance between the stop and an image plane is SL, and an axial distance between the object-side surface of the first lens element and the image plane is TTL, the following relationship is satisfied:

$0.8 < SL/TTL < 1.1$.

3. The optical image system of claim 2, wherein when a central thickness of the first lens element is CT1, the central thickness of the second lens element is CT2, a central thickness of the third lens element is CT3, and a central thickness of the fourth lens element is CT4, the following relationship is satisfied:

$0.7 < (CT1+CT2+CT3)/(CT4) < 1.9$.

4. The optical image system of claim 2, wherein when the focal length of the optical image system is f and a curvature radius of the object-side surface of the first lens element is R1, the following relationship is satisfied:

$0.20 < R1/f > 0.55$.

5. The optical image system of claim 1, wherein when the focal length of the optical image system is f and the focal length of the first lens element is f1, the following relationship is satisfied:

$0.80 < f/f1 < 1.35$.

6. The optical image system of claim 1, wherein when the central thickness of the second lens element is CT2, and the axial distance between the second lens element and the third lens element is T23 the following relationship is satisfied:

$0.35 < CT2/T23 < 0.9$.

7. The optical image system of claim 1, wherein when the focal length of the optical image system is f and a curvature radius of an object-side surface of the second lens element is R3, the following relationship is satisfied:

$-0.6 < f/R3 < 1.2$.

8. The optical image system of claim 1, wherein when an Abbe number of the first lens element is V1 and an Abbe number of the third lens element is V3, the following relationship is satisfied:

$26 < V1-V3 < 40$.

9. The optical image system of claim 1, wherein when the focal length of the optical image system is f and the focal lenth of the second lens element is f2, the following relationship is satisfied:

$0.15 < f/f2 < 0.8$.

10. The optical image system of claim 1, wherein the fourth lens element has negative refractive power.

11. The optical image system of claim 1, further comprising:
an image sensor located on an image plane, wherein when a half of a diagonal length of an effective photosensitive area of the image sensor is lmgh, and an axial distance between the object-side surface of the first lens element and the image plane is TTL, the following relationship is satisfied:

$TTL/Imgh < 2.0$.

12. An optical image system comprising, in order from an object side to an image side:
a first lens element with positive refractive power and having a convex object-side surface;
a second lens element with positive refractive power,
a third lens element with negative refractive power and having a concave object-side surface and a convex image-side surface, wherein the object-side surface and the image-side surface of the third lens element are aspheric; and
a fourth lens element with negative refractive power and having a concave image-side surface, wherein an object-side surface and the image-side surface of the fourth lens element are aspheric, wherein the fourth lens element is made of plastic material, and has at least one inflection point formed on at least one of the object-side surface and the image-side surface thereof;
wherein when a focal length of the optical image system is f, a focal length of the first lens element is f1, a focal length of the second lens element is f2, a central thickness of the first lens element is CT1, a central thickness of the second lens element is CT2, a central thickness of the third lens element is CT3, a central thickness of the fourth lens element is CT4, and a curvature radius of an object-side surface of the second lens element is R3, the following relationships are satisfied:

$0.5 < f/f1 < 1.5$;

$0 < f/f2 < 1.0$;

$0.7 < (CT1+CT2+CT3)/(CT4) < 1.9$; and $-0.6 < f/R3 < 1.95$.

13. The optical image system of claim 12, wherein when the focal length of the optical image system is f and the focal lenth of the second lens element is f2, the following relationship is satisfied:

$0.15 < f/f2 < 08$.

14. The optical image system of claim 12, wherein when an Abbe number of the first lens element is V1 and an Abbe number of the third lens element is V3, the following relationship is satisfied:

$26 < V1-V3 < 40$.

15. The optical image system of claim 12, wherein when the focal length of the optical image system is f and the curvature radius of the object-side surface of the second lens element is R3, the following relationship is satisfied:

$-0.6 < f/R3 < 1.2$.

* * * * *